US011887490B2

(12) United States Patent
Herrschaft et al.

(10) Patent No.: US 11,887,490 B2
(45) Date of Patent: Jan. 30, 2024

(54) VISUALIZATION OF WEATHER PHENOMENON ALONG A PATH IN THREE-DIMENSIONS

(71) Applicant: The Boeing Company, Chicago, IL (US)

(72) Inventors: Gene Herrschaft, Portland, ME (US); Malcolm Toon, Cape Elizabeth, ME (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 17/400,000

(22) Filed: Aug. 11, 2021

(65) Prior Publication Data

US 2022/0058968 A1 Feb. 24, 2022

Related U.S. Application Data

(60) Provisional application No. 63/068,860, filed on Aug. 21, 2020.

(51) Int. Cl.
*G08G 5/00* (2006.01)
*G01W 1/02* (2006.01)
*G01W 1/00* (2006.01)

(52) U.S. Cl.
CPC ............ *G08G 5/0091* (2013.01); *G01W 1/02* (2013.01); *G08G 5/006* (2013.01); *G08G 5/0021* (2013.01); *G01W 2001/003* (2013.01)

(58) Field of Classification Search
CPC .... G08G 5/0091; G08G 5/0021; G08G 5/006; G01W 1/02; G01W 2001/003
USPC ........................................................... 701/14
See application file for complete search history.

(56) References Cited

U.S. PATENT DOCUMENTS

| 8,674,850 | B2 | 3/2014 | Zimmer et al. |
| 9,406,238 | B2 | 8/2016 | Smith |
| 2018/0247542 | A1* | 8/2018 | Koduru ............... G08G 5/0026 |
| 2020/0105146 | A1 | 4/2020 | Schwartz et al. |
| 2021/0125507 | A1* | 4/2021 | Haider ................ G08G 5/0069 |

* cited by examiner

*Primary Examiner* — Isaac G Smith
(74) *Attorney, Agent, or Firm* — FERGUSON BRASWELL FRASER KUBASTA PC

(57) ABSTRACT

A method of presenting weather data, representing weather events, on a graphical user interface (GUI). The weather data is received. At least one of the weather events is present in at least one of several altitude zones for a physical area centered on a reference point. A corresponding intensity rank is assigned to each of the weather events. Each of the altitude zones is divided into a corresponding grid defined for the physical area. Each corresponding grid has corresponding sectors defined by corresponding lines and vertices. A corresponding highest intensity ranking weather event extant in the corresponding sectors is assigned to each of the corresponding sectors in the altitude zones. A selection of a selected altitude zone is received from among the altitude zones. A rendered image is generated by rendering the corresponding grid for the selected altitude zone. The rendered image is displayed on the GUI.

20 Claims, 19 Drawing Sheets

VISUALIZATION OF WEATHER PHENOMENON ALONG A PATH IN THREE-DIMENSIONS

RELATED APPLICATIONS

This application claims priority to U.S. Provisional Patent Application 63/068,860, filed Aug. 21, 2020, the entirety of which is hereby incorporated by reference.

BACKGROUND

While flying an aircraft, displaying a desired amount of weather information clearly at multiple altitudes on a small display device is difficult. Additionally, some display devices on an aircraft may be mobile devices which consume an undesirable amount of power while rendering such information.

SUMMARY

The one or more embodiments provide for a method of presenting weather data on a graphical user interface (GUI). The method includes assigning a corresponding intensity rank to each of the weather events. The weather events are based on weather data. At least one of the weather events is present in at least one of multiple altitude zones defined for a physical area centered on a reference point. The method also includes dividing each of the altitude zones into a corresponding grid defined for the physical area. Each corresponding grid has corresponding sectors defined by corresponding lines and vertices. The method also includes assigning, to each of the corresponding sectors in the altitude zones, a corresponding highest intensity ranking weather event extant in the corresponding sectors. The method also includes receiving a selection of a selected altitude zone from among the altitude zones. The method also includes generating a rendered image by rendering the corresponding grid for the selected altitude zone. The method also includes displaying the rendered image on the GUI.

The one or more embodiments also provide for a system. The system includes a processor, a communication device connected to the processor, and a non-transitory computer readable storage medium connected to the processor. The non-transitory computer readable storage medium stores weather data representing weather events present in at least one of several altitude zones for a physical area centered on a reference point. The non-transitory computer readable storage medium also stores a corresponding intensity rank assigned to each of the weather events. The non-transitory computer readable storage medium also stores a corresponding grid defined for the physical area at each of the altitude zones, the corresponding grid having corresponding sectors defined by corresponding lines and vertices. The non-transitory computer readable storage medium also stores a corresponding highest intensity ranking weather event extant in each of the corresponding sectors. The non-transitory computer readable storage medium also stores a selected altitude zone from among the altitude zones. The non-transitory computer readable storage medium also stores a rendered image having a corresponding grid for the selected altitude zone. The corresponding grid for the selected altitude zone has corresponding lines and vertices and corresponding sectors highlighted according to the corresponding highest intensity ranking weather event extant in each of the corresponding sectors in the selected altitude zone. The system also includes a pre-processing program executable by the processor to receive the weather data from the communication device. The pre-processing program is also executable by the processor to assign the corresponding intensity rank to each of the weather events. The pre-processing program is also executable by the processor to divide each of the altitude zones into the corresponding grid. The pre-processing program is also executable by the processor to assign, to each of the corresponding sectors in the altitude zones, the corresponding highest intensity ranking weather event extant in the corresponding sectors. The pre-processing program is also executable by the processor to receive a selection of the selected altitude zone. The system also includes a rendering engine executable by the processor to generate the rendered image by being configured to render the corresponding grid for the selected altitude zone by rendering the corresponding lines and vertices for the selected altitude zone. The rendering engine is also executable by the processor to render the corresponding sectors for the selected altitude zone, by highlighting each of the corresponding sectors according to the corresponding highest intensity ranking weather event extant in each of the corresponding sectors in the selected altitude zone. The system also includes a display device connected to the processor and configured to display the rendered image.

The one or more embodiments also provide for a non-transitory computer readable storage medium storing computer useable program code which, when executed by a processor, performs a computer-implemented method of presenting weather data on a graphical user interface (GUI). The computer-implemented method includes receiving the weather data. The weather data represents weather events. At least one of the weather events is present in at least one of several altitude zones for a physical area centered on a reference point. The computer-implemented method also includes assigning a corresponding intensity rank to each of the weather events. The computer-implemented method also includes dividing each of the altitude zones into a corresponding grid defined for the physical area. Each corresponding grid has corresponding sectors defined by corresponding lines and vertices. The computer-implemented method also includes assigning, to each of the corresponding sectors in the altitude zones, a corresponding highest intensity ranking weather event extant in the corresponding sectors. The computer-implemented method also includes receiving a selection of a selected altitude zone from among the altitude zones. The computer-implemented method also includes generating a rendered image by rendering the corresponding grid for the selected altitude zone. The computer-implemented method also includes displaying the rendered image on the GUI.

Other aspects of the invention will be apparent from the following description and the appended claims.

DETAILED DESCRIPTION

Figure 1:
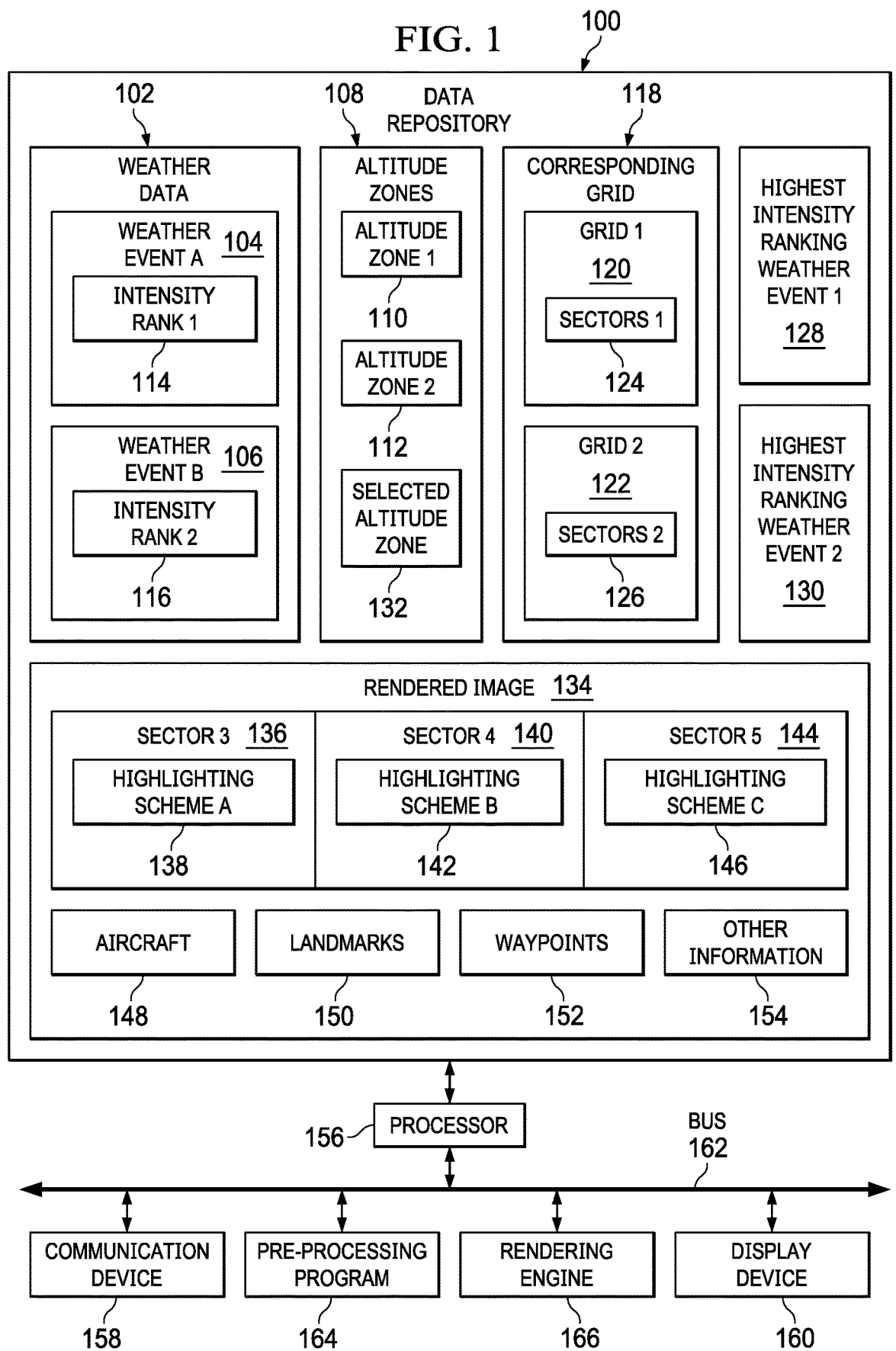
FIG. 1 shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

In general, embodiments of the invention relate to overcoming two technical hurdles. The first technical hurdle is to present a vast amount of relevant weather data on a small display screen in a manner that is quickly understandable to a pilot navigating an aircraft in flight. The second technical hurdle is to conserve battery power on a mobile device used by the pilot to display the relevant weather data.

To address the first technical hurdle, the one or more embodiments divides the weather data into several altitude zones, such increments of 1000 feet between 1000 feet and 40,000 feet, though different zone increments could be used. The one or more embodiments then divides each altitude zone into a corresponding grid centered on a reference point. The reference point may be any convenient reference point, such as a current, past, or predicted position of the aircraft. However, the center point of the grid need not be related to any position of the aircraft. Rather, the one or more embodiments provide for methods for rendering a flight preview or post-view, as well for showing weather conditions around the current location of the aircraft.

Each type of weather event within a given grid is ranked according to intensity. For example, turbulence could be ranked on a scale of zero (not present) to five (most intense) and icing conditions could be ranked on a scale of zero to five. The type of the weather event and the intensity of the weather event is represented by a color or highlighting assigned to a sector in the grid. If desirable, the most intense weather event applicable to the sector is the color or highlighting applicable to the sector. In an embodiment, a pilot can select among different weather types so that only a single weather type is shown in the grid at a time. In other embodiments, multiple weather types could be shown in a sector, such as by using multiple colors or highlighting types in a sector. To further aid the pilot, the pilot may select a different altitude zone to quickly assess the associated grid and weather data for the new altitude zone. Thus, a pilot can quickly assess weather patterns in three dimension around the aircraft (i.e., above, below, and in the two-dimensional plane around the aircraft). The reference point for viewing weather need not the aircraft, and thus the one or more embodiments are also useful for viewing the weather in remote locations for flight planning purposes. Other data can also be shown on a graphical user interface (GUI) for reference, such as but not limited to the aircraft, a flight path of the aircraft, landmarks, a map, waypoints, a selected altitude zone, a time, a current altitude, a current speed, a camera orientation, a time of flight, etc. The point of view (c.f. camera position, as if the aircraft were being observed by an external camera) of the GUI may also be adjusted so that the pilot can see the weather patterns, landmarks, and other features from different angles.

To address the second technical hurdle, that of limited battery power in a mobile device taken onto the aircraft, the one or more embodiments may take into account when weather data is rendered. In a power savings embodiment, or to speed up processing generally, weather data may be rendered only after an altitude is selected. In this manner, the total amount of rendering calculations, and hence processing power, may be reduced.

Attention is now turned to the figures. FIG. 1 shows a computing system, in accordance with one or more embodiments of the invention. The computing system includes a data repository (100). In one or more embodiments of the invention, the data repository (100) is a storage unit and/or device (e.g., a file system, a database, a collection of tables, or any other storage mechanism) for storing data. Further, the data repository (100) may include multiple different storage units and/or devices. The multiple different storage units and/or devices may or may not be of the same type and may or may not be located at the same physical site. The data repository (100) may be characterized as a non-transitory computer readable storage medium. However, the data used in the system may be transferred to and used by a random access memory during processing of the data.

The data repository (100) stores a number of different types of information. For example, the data repository (100) stores weather data (102). As used herein, the weather data (102) is data relating to the weather, including but not limited to wind speed, wind direction, air temperature, humidity, storms, barometric pressure, visibility, cloud locations, cloud types, etc. The weather data (102) represents one or more weather events, such as for example weather event A (104) and weather event B (106). As used herein, a weather event is a specific instance of a type of weather of interest, or a condition of interest that may be induced by the weather. Examples of weather events include, for example, turbulence, icing conditions, wind shear, electrical strikes (i.e., lightning), overall visibility, etc.

The one or more weather events are present in at least one of several altitude zones (108), such as altitude zone 1 (110) and altitude zone 2 (112), for a physical area centered on a reference point. The reference point may be a predicted future position of an aircraft, past position of the aircraft, a current position of the aircraft, or a location away from the aircraft. In the latter case, the location away from the aircraft is useful for route planning and/or wide-area representation of weather data.

As used herein, an altitude zone is a pre-determined height range as measured from sea level on Earth. Many different altitude ranges could be used to define the extent of the altitude zones (108), depending on the granularity desired by the pilot and the granularity of the weather data (102). In a non-limiting example, the altitude zones (108) may be separated by segments of 1000 feet. In one embodiment, all altitude zones (108) are equal. However, in other embodiments the altitude zones (108) may vary with respect to each other. Thus, in a non-limiting example, the altitude zone 1 (110) could be 500 feet and the altitude zone 2 (112) could be 1000 feet.

A corresponding intensity rank assigned to each of the weather events. Thus, for example, intensity rank 1 (114) is assigned to weather event A (104) and intensity rank 2 (116) is assigned to weather event B (106). As used herein, an "intensity rank" is a numerical ranking assigned to a weather event to indicate a quantitative assessment of the intensity of a weather event. In particular, a measured numerical property of the weather event is compared to a range of the numerical properties, and if the measured numerical property falls within the range, then the rank assigned to the range is the intensity rank for that weather event. In a specific example, turbulence can be measured as turbulent kinetic energy. If the turbulent kinetic energy falls within the highest of five ranges of turbulent kinetic energy, then the intensity of the turbulence weather event is assigned a value of five. A similar procedure may be used to indicate icing conditions, wind shear, and other types of weather events. Thus, each weather event may have its own corresponding intensity rank. Intensity ranks do not all have to be on the same scale. For example, the intensity rank 1 (114) may vary from one to five, but the intensity rank 2 (116) may vary from one to ten. Nevertheless, each intensity rank will be useful for showing on a GUI, via highlighting, the relative intensity of one or more weather events in a sector on the GUI.

The data repository (100) also stores a corresponding grid (118) defined for the physical area at each of the altitude zones (108). A grid is a pattern of connected shapes displayable on a GUI. A grid is defined by lines that define the boundaries of a sector and vertices that indicate the intersections of lines. One grid is generated for each of the altitude zones (108). Thus, for example, grid 1 (120) is generated for the altitude zone 1 (110) and grid 2 (122) is generated for the altitude zone 2 (112).

Each corresponding grid (118) is formed of corresponding sectors defined by corresponding the lines and the vertices of the corresponding grid (118). Thus, for example, the grid 1 (120) includes sectors 1 (124) and the grid 2 (122) includes sectors 2 (126). The number of sectors in each grid need not be the same. Typically, dozens or even hundreds of sectors are present in each grid, though more or fewer sectors may be in each grid.

A grid pattern may take different forms. The grid pattern, for example, may take the form of connected squares, such as shown in FIG. 4 through FIG. 15. However, the grid pattern may be a triangle grid pattern, a hexagon grid pattern, a radial grid pattern, an unstructured mesh grid pattern, a curved grid pattern, an irregular grid pattern, or any other grid pattern. Sectors within a grid need not have the same size, though the grid may be a regular pattern of equally sized sectors. Each sector represents a certain amount of area in the real environment around the reference point. The scale of physical representation need not be the same for each sector, but may be the same in some embodiments. In a specific non-limiting embodiment (shown in FIG. 4 through FIG. 15), each grid at each altitude zone is a pattern of equally sized and scaled squares, with each square representing a two-mile by two-mile area (four square miles).

A corresponding highest intensity ranking weather event is associated for each such weather event extant in each of the corresponding sectors. In other words, for each sector in each grid, the highest intensity ranking weather event is associated with a given sector. For example, highest intensity ranking weather event 1 (128) is assigned to one sector in the sectors 1 (124) and the highest intensity ranking weather event 2 (130) is assigned to another sector in the sectors 2 (126). In a specific example, assume that sector A in the sectors 1 (124) is associated with three weather events: icing conditions intensity rank 1, wind shear rank 2, and turbulence rank 3. The turbulence rank 3 is assigned as the highest intensity ranking weather event 1 (128) for sector A in the sectors 1 (124). In this manner, each individual sector in each grid (e.g, all sectors in all altitude zones (108)) has an associated highest intensity ranking weather event.

The data repository (100) also stores a selected altitude zone (132) from among the altitude zones (108). The selected altitude zone (132) is an altitude zone for which the corresponding grid (118) at that altitude zone will be displayed on the GUI. The selected altitude zone (132) may be selected by the user, or may be automatically selected based on some formula or rule. In the examples of FIG. 4 through FIG. 14, the selected altitude zone (132) is chosen by the user by sliding on the altitude bar at the right side of the GUI. Note that the selected altitude zone (132) is not necessarily the altitude at which the plane is flying, and in many cases will not be the same. The selected altitude zone (132) may be above or below the altitude zone in which the reference point is presently situated, which allows a pilot to view weather above or below the reference point.

The data repository (100) may also store a rendered image (134). The rendered image (134) is the corresponding grid (118) for the selected altitude zone (132). Again, the corresponding grid (118) for the selected altitude zone (132) includes corresponding lines and vertices and corresponding sectors. The corresponding sectors are highlighted according to the corresponding highest intensity ranking weather event extant in each of the corresponding sectors in the selected altitude zone (132). Note that in some embodiments the rendered image may be stored in general processing unit (GPU) random access memory (RAM) in order to increase the speed of processing and/or to reduce battery power used.

Thus, for example, the rendered image (134) may show three sectors, sector 3 (136), sector 4 (140), and sector 5 (144) in relation to a reference point (148), Landmarks (150), Waypoints (152), and Other Information (154). Each sector has its own highlighting scheme. Thus, the sector 3 (136) has highlighting scheme A (138), the sector 4 (140) has highlighting scheme B (142), and the sector 5 (144) has highlighting scheme C (146).

A highlighting scheme is a highlighting applied to a sector. In an embodiment, a highlighting scheme may be to fill a sector with a color corresponding to the highest intensity ranking weather event. The color may indicate the type of weather event, and the intensity of the color may indicate the intensity of the highest intensity ranking weather event. However, a sector may have more than one color highlighting, such as for when multiple weather events are of interest to a pilot. The highlighting schemes for the sectors may all be the same, if the weather is consistent within a large area around the reference point (148). Note that other highlighting schemes are possible, such as changing the colors or visibility of lines and vertices, animations present within sectors, etc.

The Landmarks (150) may be features such as the ground, mountains, trees, buildings, runways, etc. The Waypoints (152) may be waypoints along an aircraft's intended flight path. The Other Information (154) may include many other types of information, such as the presence of other aircraft, GUI interactive inputs (slide bars, buttons, etc.), weather readings, the time, power remaining in the mobile device rendering the GUI, the intended flight path as a line, and possibly many other forms of information of interest to the pilot. In an embodiment, the GUI gives the pilot the option of hiding certain information for the sake of clarity or to reduce screen clutter.

The system shown in FIG. 1 may include other components or software. For example, the system shown in FIG. 1 may include a processor (156), a communication device (158), and a display device (160). The data repository (100), the communication device (158), and the display device (160) are all connected to the processor (156) and to each other via a bus (162). Thus the system shown in FIG. 1 may be embodied in the form of a laptop, tablet, mobile phone, etc., but could also be embodied as a desktop computer, an onboard computer on an aircraft, etc. In an embodiment, elements of the system shown in FIG. 1 may be embodied as a remote server which processes information and transmits renderable images to a local device, though the at least one local display device is available on the aircraft to be able to display rendered images.

The processor (156) is a computer processor and is configured, via execution of a pre-processing program (164) and a rendering engine (166), to perform the calculations necessary to generate the rendered image (134). The processor (156) may be a distributed computing system, but in an embodiment is a single processor on a local device. Examples of the processor (156) are described with respect to FIG. 16A and FIG. 16B.

The communication device (158) is a wired or wireless communication system. Wireless communications systems include BLUETOOTH® for communicating with an onboard communication system on the reference point (148), or may connected to a wireless and/or cellular network, such as the 5G NETWORK®. In any case, the communication device (158) is configured to send and receive data so that the processor (156) can process the weather data (102) and generate the rendered image (134) according to the techniques described with respect to FIG. 2. Examples of the communication device (158) are described with respect to FIG. 16A and FIG. 16B.

The display device (160) is a computer or a television screen. The display device (160) could be a liquid crystal display or an older technology, but in most cases the display device (160) will be the screen of the laptop, tablet, or mobile phone which houses the processor (156). Examples of the display device (160) are described with respect to FIG. 16A and FIG. 16B.

As indicated above, the processor (156) executes the pre-processing program (164) and the rendering engine (166) to accomplish the method of FIG. 2A, FIG. 2B, FIG. 2C, FIG. 2D, FIG. 2E, and FIG. 2F in order to generate the rendered image (134) for display on the display device (160). Thus, the details of the operation of the pre-processing program (164) and the rendering engine (166) are described with respect to the flowchart of FIG. 2.

However, briefly, the pre-processing program (164), when executed by the processor (156), is configured to receive the weather data (102) from the communication device (158), assign the corresponding intensity rank to each of the plurality of weather events, divide each of the plurality of altitude zones into the corresponding grid (118), assign, to each of the corresponding sectors in the plurality of altitude zones, the corresponding highest intensity ranking weather event extant in the corresponding sectors, and receive a selection of the selected altitude zone (132). In turn, the rendering engine (166), when executed by the processor (156), is configured to render the corresponding grid (118) for the selected altitude zone (132) by rendering the corresponding lines and vertices for the selected altitude zone (132), and render the corresponding sectors for the selected altitude zone (132), by highlighting each of the corresponding sectors according to the corresponding highest intensity ranking weather event extant in each of the corresponding sectors in the selected altitude zone (132).

While FIG. 1 shows a configuration of components, other configurations may be used without departing from the scope of the invention. For example, various components may be combined to create a single component. As another example, the functionality performed by a single component may be performed by two or more components. Thus, for example, the presentation system that performs rendering may be separate from the pre-processing system that fetches weather data over the network. Other variations are possible.

FIG. 2A through FIG. 2F show methods for presenting weather data on a graphical user interface (GUI), in accordance with one or more embodiments. The methods shown in FIG. 2A through FIG. 2F may be performed using the system shown in FIG. 1. The methods shown in FIG. 2A through FIG. 2F are typically performed by a local device on an aircraft, but could be executed by a server which then transmits renderable images to the local device. The methods shown in FIG. 2A through FIG. 2F may be characterized as methods of presenting weather data on a graphical user interface (GUI).

At step (200), weather data is received. As described with respect to FIG. 1, the weather data represents weather events, and at least one of the weather events is present in at least one of several altitude zones for a physical area centered on a reference point. The weather data may be received from a weather service via a communication device, by direct instrument readings on the aircraft, from measurements performed by other aircraft in the area, from satellites, or from a variety of other sources. The weather event may be different types of weather events, including clear weather, icing conditions, turbulence, cross winds, a cloud layer, a cloud base, a temperature, a wind speed, combinations thereof, and other kinds of weather events.

Note that the weather data received at step (200) may be the inputs to the pre-processing program (164) described in FIG. 1.

At step (202), a corresponding intensity rank is assigned to each of the weather events. The intensity rank may be assigned to different parts of a single weather event. The intensity rank may be assigned to different areas in a physical space based on latitude, longitude, and altitude. However, perhaps after the grids are defined in the next step, the intensity rankings may be assigned on a sector-by-sector basis. For example, turbulence may be present in many sectors of a grid at a particular selected altitude; however, the turbulence may be better or worse in different sectors within the grid at that selected altitude. Thus, the assigning of intensity ranks to weather events may be performed on a sector-by-sector basis in a given grid at a given selected altitude.

At step (204) each of the altitude zones are divided into a corresponding grid defined for the physical area around a reference point. As indicated above, each corresponding grid has corresponding sectors defined by corresponding lines and vertices. The grid is formed by dividing the virtual space that represents the real space at a selected altitude into virtual sectors separated by virtual lines and vertices. The lines and vertices may form different kinds of grids, such as a square grid, a hexagon grid, a triangle grid, a radial grid, an unstructured mesh grid, a curved grid, etc.

At step (206), a corresponding highest intensity ranking weather event extant in the corresponding sectors is assigned to each of the corresponding sectors in the plurality of altitude zones. Assigning at step (206) may be performed by establishing a table or other data structure for associating weather data in an area to an intensity ranking and then determining highest intensity weather event in the area. Note that it is possible to show lower intensity weather events in sectors, or to show multiple weather events in sectors. However, in an embodiment, to simplify the view for the pilot, only the most intense weather event will be displayed, it being presumed that lower intensity weather events will not be of as much interest to the pilot as the highest intensity weather events.

At step (208), a selection of a selected altitude zone is received from among the available altitude zones. For example, a user may use a sliding scale (see FIG. 4 through FIG. 14) to quickly slide through different altitude zones until the selected altitude zone is reached. A user may directly input an altitude into an entry box in the GUI, and the altitude zone corresponding to that altitude will be selected. A user may provide a voice command for a desired altitude zone. Many other forms of input are contemplated, including automated input, such as when the system determines that the pilot should be notified of particularly intense weather at some altitude zone near the reference point.

At step 210, a rendered image is generated by rendering the corresponding grid for the selected altitude zone. Rendering may be performed using a rendering engine, and/or a graphics processor. FIG. 2C describes additional details regarding rendering of the grid.

At step 212, the rendered image is displayed on the GUI. The display of the rendered image may be performed using a graphics program available on the computer performing the method of FIG. 2A.

Figure 2A:
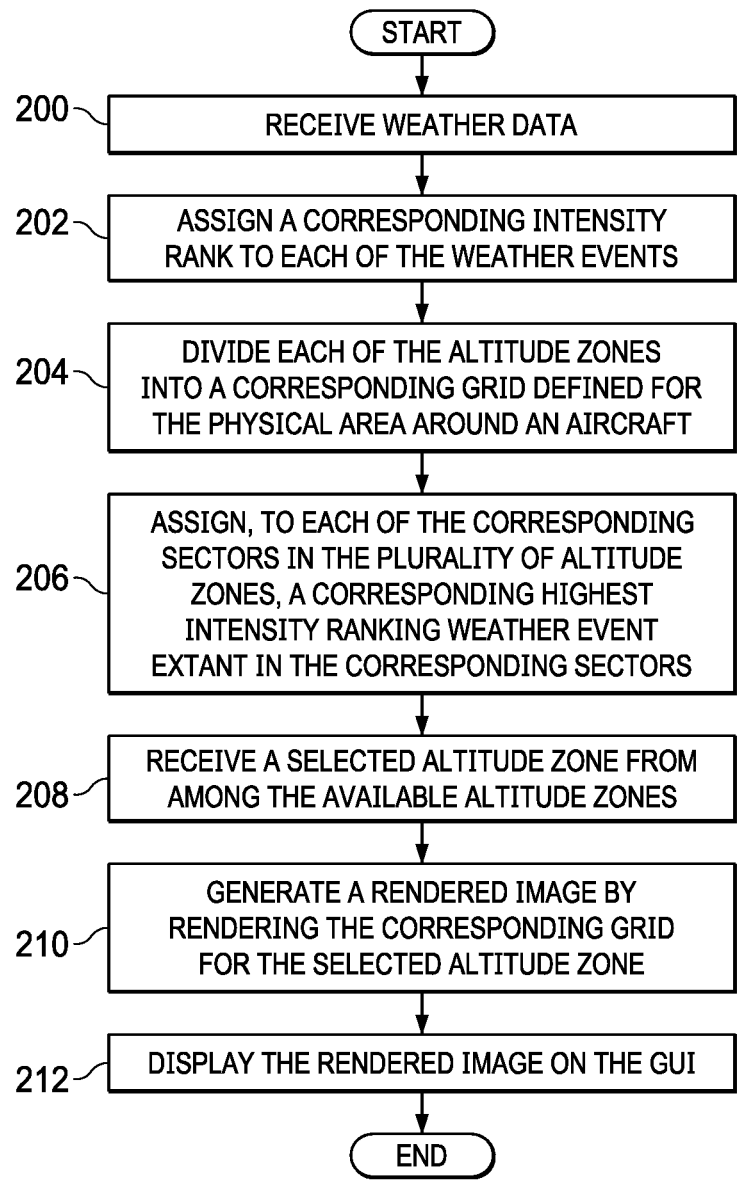
FIG. 2A, FIG. 2B, FIG. 2C, FIG. 2D, FIG. 2E, and FIG. 2F show methods for presenting weather data on a graphical user interface (GUI), in accordance with one or more embodiments of the invention.

In an embodiment, the method of FIG. 2A may terminate thereafter. However, other variations and details are possible, as described further below.

Figure 2B:
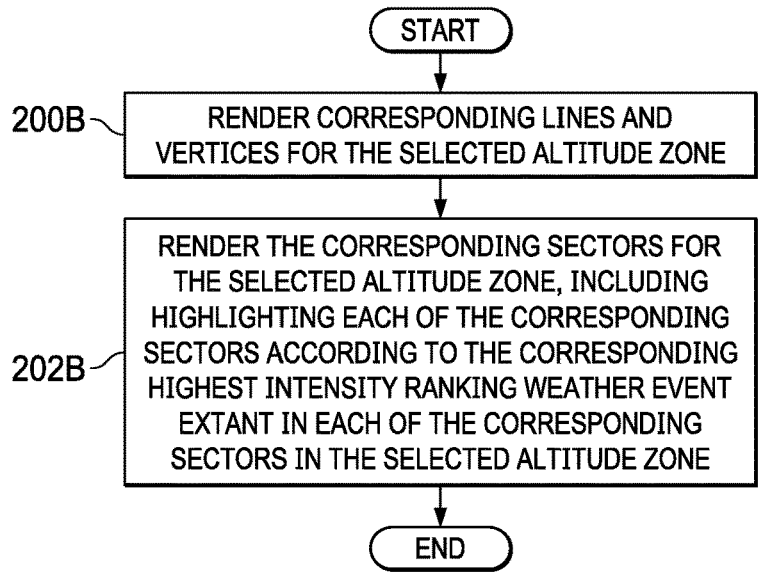
Figure 2C:
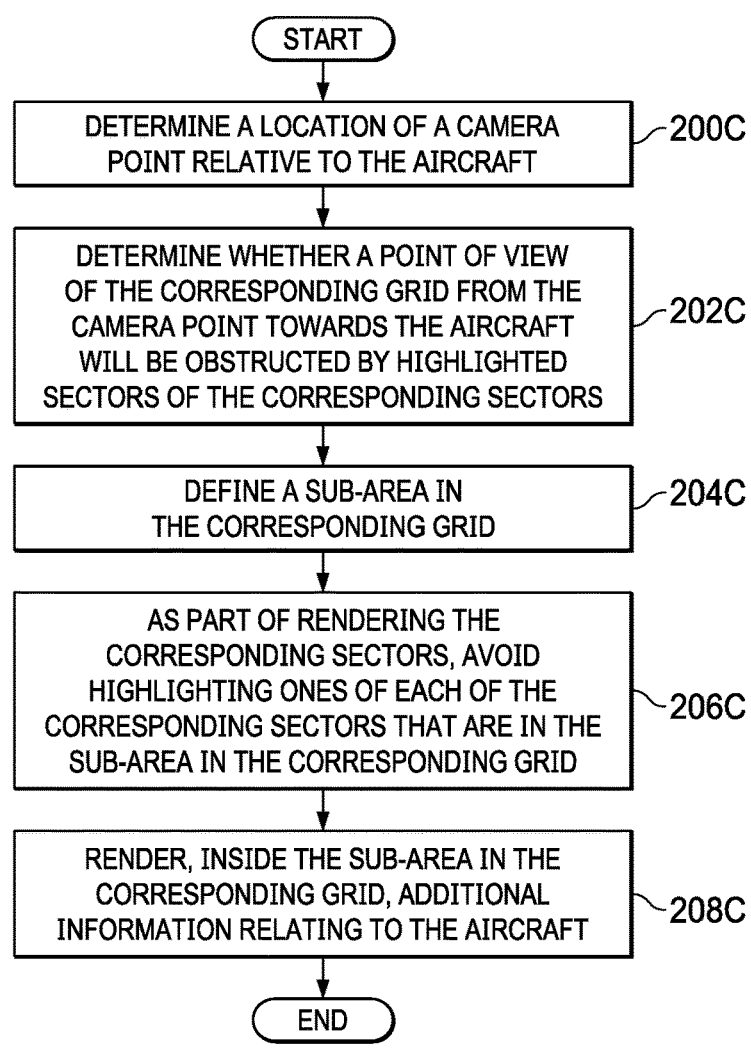

FIG. 2B shows a method for generating a rendered image. Thus, the method of FIG. 2B shows details of step 210 in FIG. 2A.

At step 200B, the corresponding lines and vertices are rendered for the selected altitude zone. Rendering is accomplished using a rendering engine using any number of acceptable rendering techniques. One such technique could be the conversion of latitude, longitude and altitude into a Cartesian coordinate system as vertices interpretable by the general processing unit (GPU). Groups of vertices that make up a solid object (e.g. the corners of a box) are then grouped together into a memory buffer, sent to the GPU, and rendered by a program written to execute on the GPU. The exact visual representation is encoded in the GPU program (e.g. outlining the boxes with lines, etc.). In an embodiment, the lines and vertices of the grid are rendered after selection of the altitude zone. In this manner, processing power can be conserved by only rendering the grid and sectors for a grid without having to render the grids and sectors at other altitude zones.

At step 202B, the corresponding sectors for the selected altitude zone are rendered, including highlighting each of the corresponding sectors according to the corresponding highest intensity ranking weather event extant in each of the corresponding sectors in the selected altitude zone. The rendering techniques used may be similar to those described above. Highlighting may be accomplished using a variety of different techniques, such as by using colors, altering transparencies, adding shapes or borders or edges to a sector, adding animations to a sector, etc. In some embodiments, at least two different sectors in the corresponding sectors have at least two different colors to show different highest intensity rankings in the at least two different sectors. Thus, the corresponding sectors may be highlighted according to types of weather in the corresponding sectors. The types of weather may be rendered as changes in the highlighting.

FIG. 2C shows a method for changing a point of view in a rendered image. Thus, the method of FIG. 2C relate to additional steps performed relative to the method shown in FIG. 2A. The method of FIG. 2C may be performed before generating the corresponding sectors for the selected altitude zone.

At step 200C, a location of a camera point relative to the reference point is determined. The camera point is a virtual point selected in the physical area represented at one of the altitude zones. The camera point may be in a different altitude zone than the selected altitude zone. The camera point may be moveable by the user manipulating the GUI, or automatically.

At step 202C, a determination is made whether a point of view of the corresponding grid from the camera point towards the reference point will be obstructed by highlighted sectors of the corresponding sectors. The determination may be made by determining whether a line of sight from the camera point to the reference point intersects one or more sectors that will be highlighted as a result of representing the weather data.

At step 204C, responsive to a determination that the point of view will be obstructed by highlighting, a sub-area in the corresponding grid is defined. The sub-area is defined by designating a shape of a pre-determined size around the reference point. For example, the sub-area could be a circle or sphere of a pre-determined radius, with the reference point at the center. However, other shapes could be used.

At step 206C, as part of rendering the corresponding sectors, highlighting is avoided for ones of each of the corresponding sectors that are in the sub-area in the corresponding grid. In other words, the sectors in the sub-area are skipped during highlighting, or a command is given to unhighlight the sectors in the sub-area. Note that the sub-area may extend partially into sectors. Thus, for example, a portion of a sector within the sub-area may be unhighlighted, with the rest of the sector highlighted normally. In an embodiment, the grid lines and vertices may continue to be drawn within the sub-area. Thus, a user may see the reference point and empty sectors in a circle around the reference point, yet see highlighted or partially highlighted sectors outside of the sub-area. Examples of this view are given in FIG. 6, FIG. 7, FIG. 9, and FIG. 10 through FIG. 12.

Figure 13:
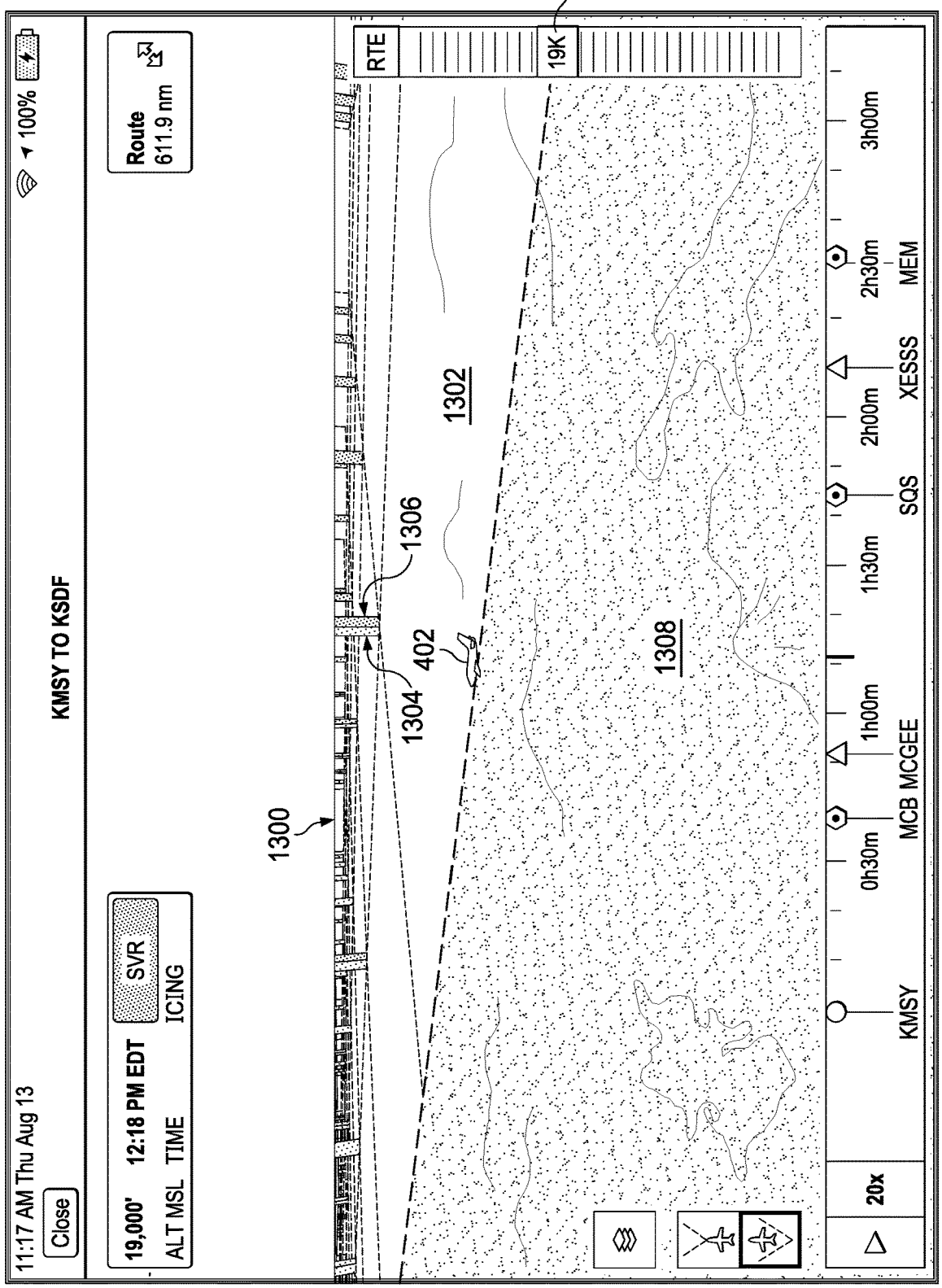
FIG. 13, FIG. 14, and FIG. 15 are screenshots of an example graphical user interface (GUI) that may be formed using the methods of FIG. 2A, FIG. 2B, FIG. 2C, FIG. 2D, FIG. 2E, and FIG. 2F, in accordance with one or more embodiments of the invention.
Figure 15:
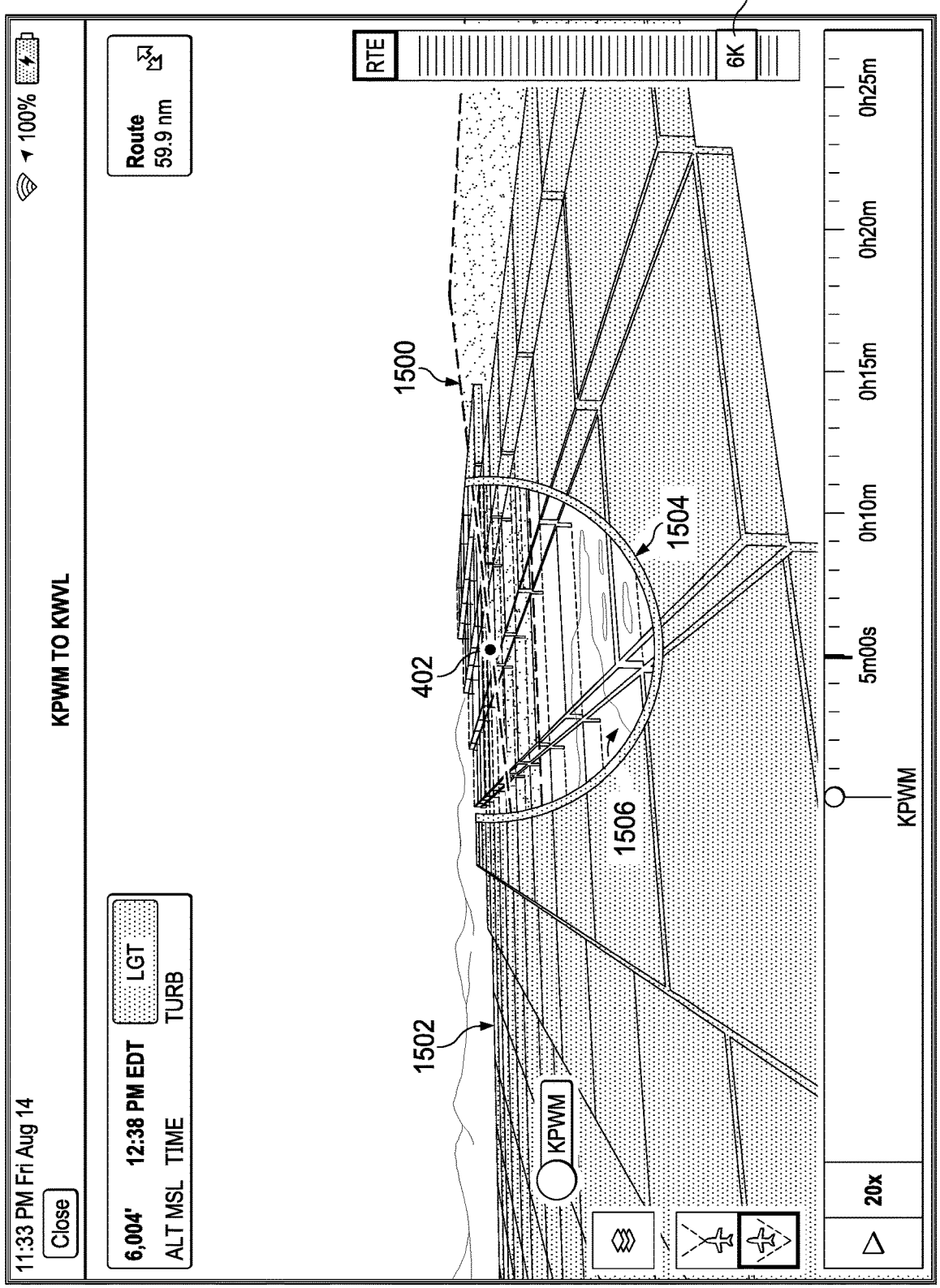

In an alternative, the sub-area may be defined along an entire plane of the corresponding grid. Thus, for example, all sectors may be unhighlighted, though the grid still displayed. An example of this view is shown in FIG. 13. In still another alternative, the sub-area may be defined along part of a plane, but also include a portion of the circle or sphere of unhighlighted sectors. In this case, the sub-area appears as a partial circle or sphere, along with an intersecting plane of sectors that are not highlighted. The sub-area, and hence not all of the unhighlighted sectors, need be contiguous. An example of this view is shown in FIG. 15. Thus, the shape of the sub-area may take different forms.

In an embodiment, prior to displaying the rendered image on the GUI, at step 208C, the method of FIG. 2C may include rendering, inside the sub-area in the corresponding grid, additional information relating to the aircraft. One purpose for defining the sub-area and not highlighting the sectors in the sub-area is to allow additional information to be shown, such as text, landmarks, the reference point, the aircraft itself, a path of flight, etc. Thus, for example, the additional information is selected from the group consisting of: an icon of the reference point, an icon of the aircraft, a flight path of the aircraft, an altitude of the aircraft, a speed of the aircraft, a waypoint along an intended flight path of the aircraft, a destination of the aircraft, landmarks on a surface beneath the reference point (or aircraft), and combinations thereof.

Figure 2D:
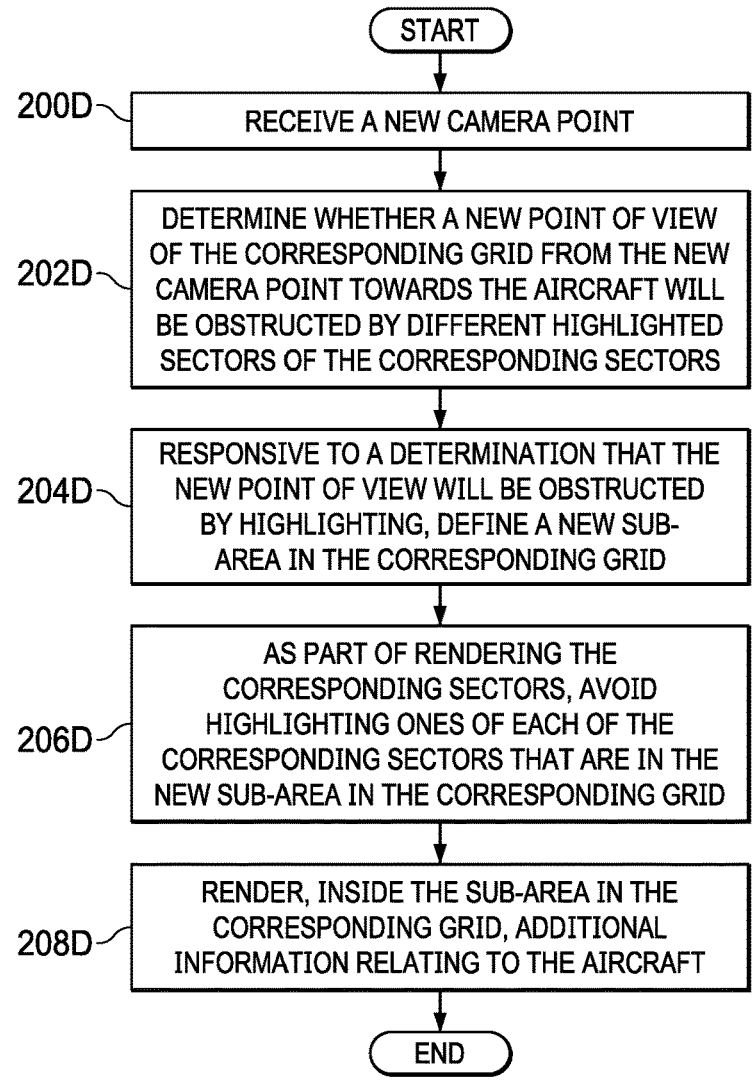

FIG. 2D is a method for changing the camera point of view on the GUI. The method of FIG. 2D may be performed after the method of FIG. 2A.

At step 200D, (after displaying at step 212), a new camera point is received. The new camera point may be received either automatically from a command from the computer, or via user input. The user input may be, for example, for a user to touch the screen displaying the GUI and drag the view around to a different view desired by the user. Alternatively, the user may designate a coordinate point, including altitude, latitude, and longitude (or some other reference system) to set the camera point.

At step 202D, a determination is made whether a new point of view of the corresponding grid from the new camera point towards the reference point will be obstructed by different highlighted sectors of the corresponding sectors. The determination may be made as described above with respect to step 202C of FIG. 2C.

At step 204D, responsive to a determination that the new point of view will be obstructed by highlighting, a new sub-area in the corresponding grid is defined. The definition may be performed as described above with respect to step 204C of FIG. 2C.

At step 206D, as part of rendering the corresponding sectors, highlighting is avoided for ones of each of the corresponding sectors that are in the new sub-area in the corresponding grid. Step 206D may be performed in a manner similar to step 206C in FIG. 2C.

As above, the method may also include at step 208D, rendering, inside the sub-area in the corresponding grid, additional information relating to the aircraft. Step 208D may be performed in a manner similar to step 208C in FIG. 2C.

Figure 2E:
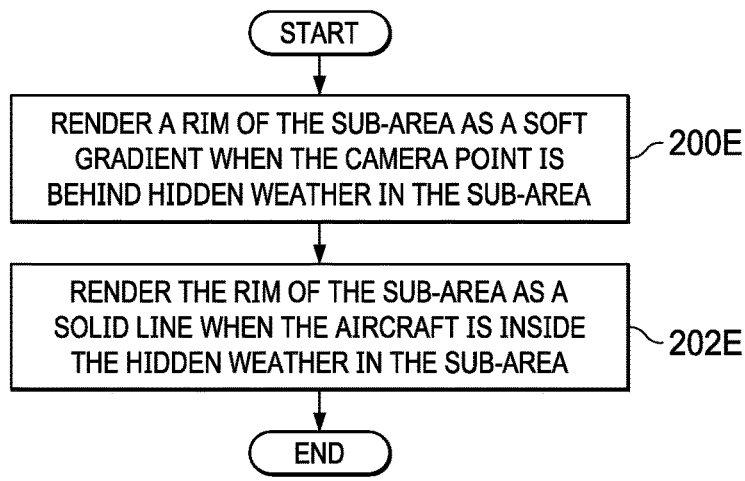

FIG. 2E is a method of modifying the rendering of the grid with respect to the boundary of the sub-area described above. The method of FIG. 2E thus may be performed as part of step 210 of FIG. 2A, step 200B of FIG. 2B, step 204C of FIG. 2C, and step 204D of FIG. 2D.

Figure 10:
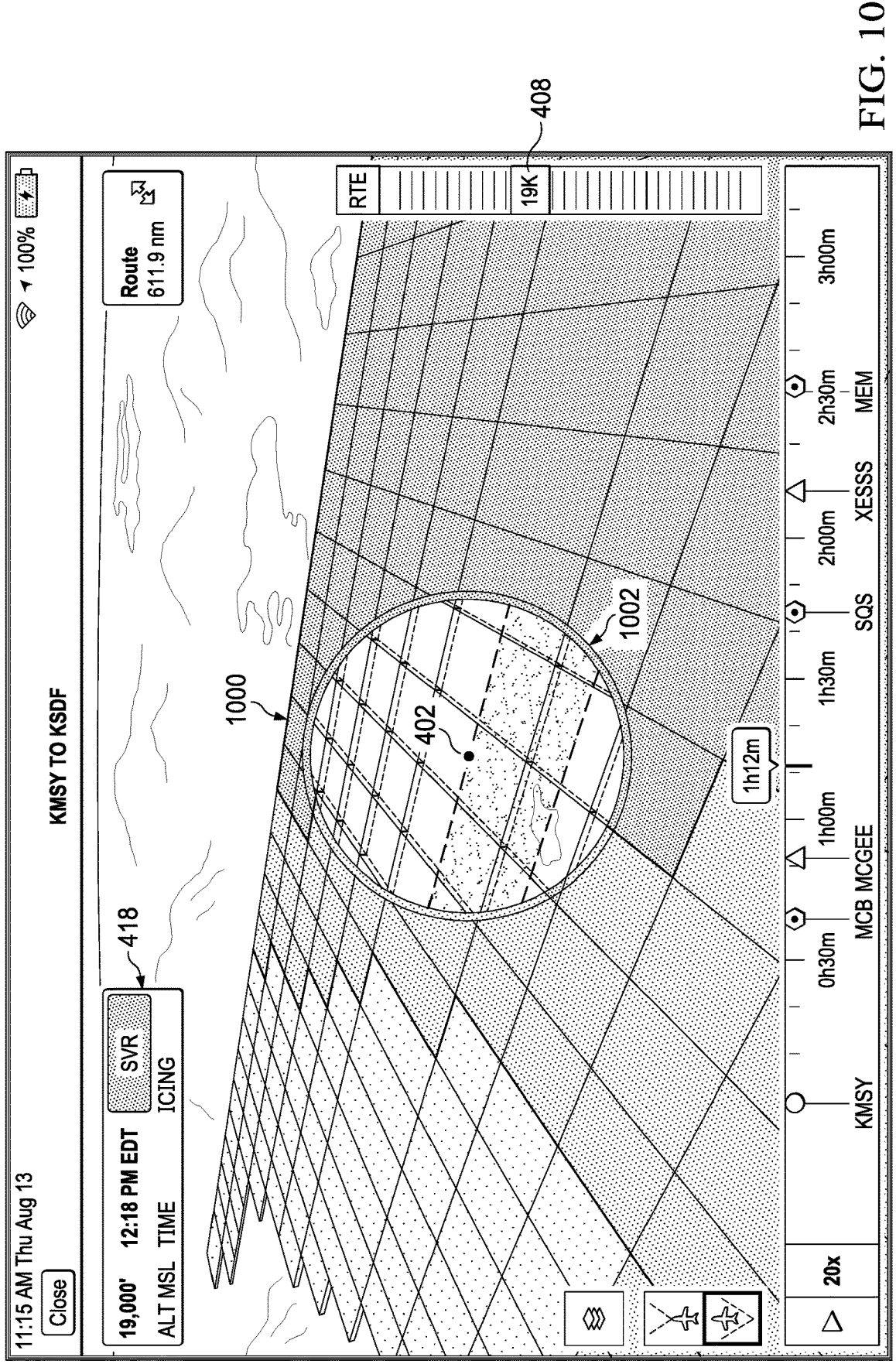

At step 200E, a rim of the sub-area is rendered as a soft gradient when the camera point is behind hidden weather in the sub-area. An example of this rendering is shown in FIG. 10.

Figure 9:
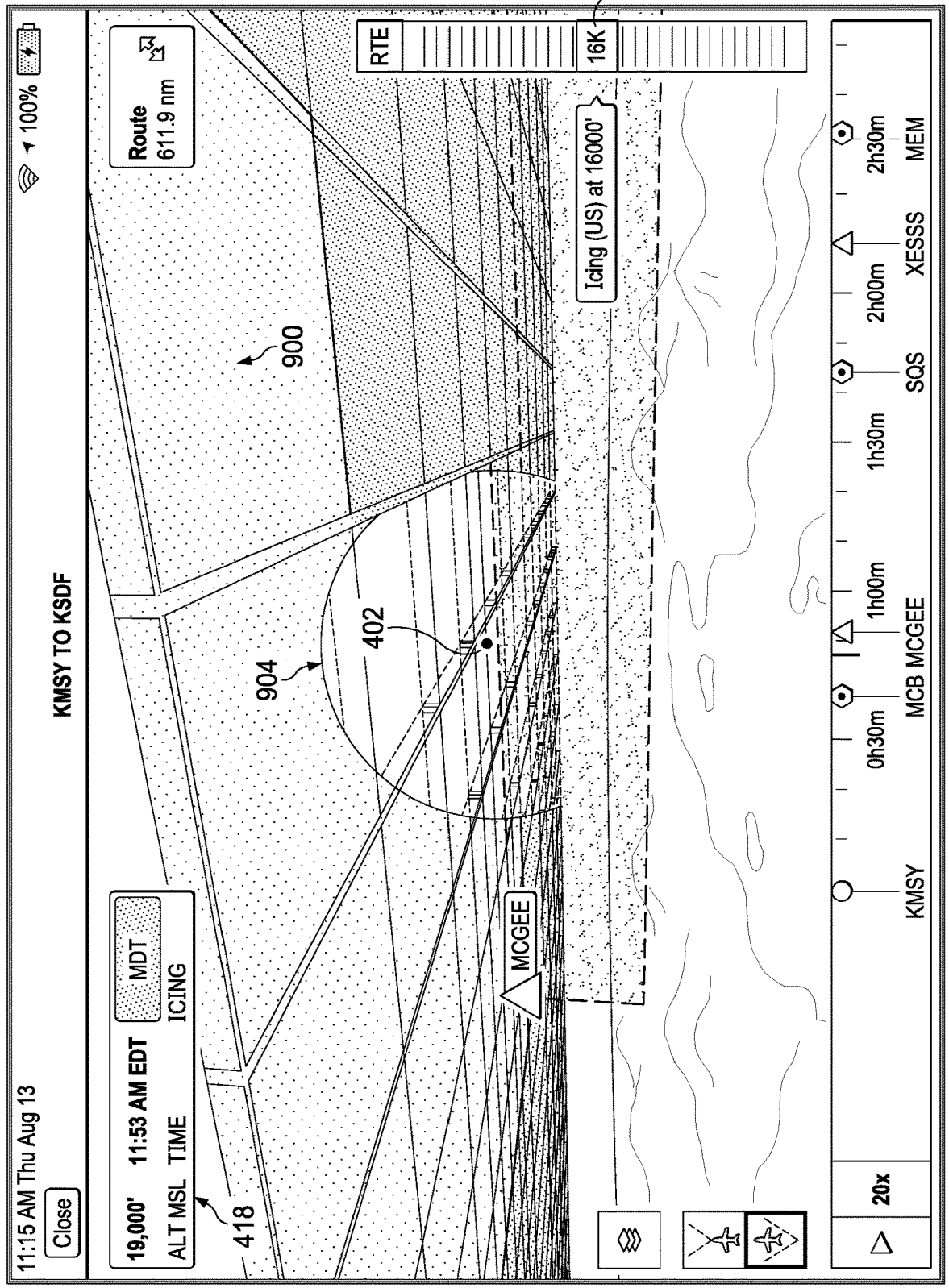

At step 202E, the rim of the sub-area is rendered as a solid line when the reference point is inside the hidden weather in the sub-area. An example of this rendering is shown in FIG. 9.

In either case, the rendering of the rim of the sub-area helps the user to identify the perspective of the camera and quickly locate the reference point relative to the sectors being rendered. The rendering itself may be performed as part of rendering the sub-area in the corresponding grid, such as at step 208C in FIG. 2C, or step 208D in FIG. 2D.

Figure 2F:
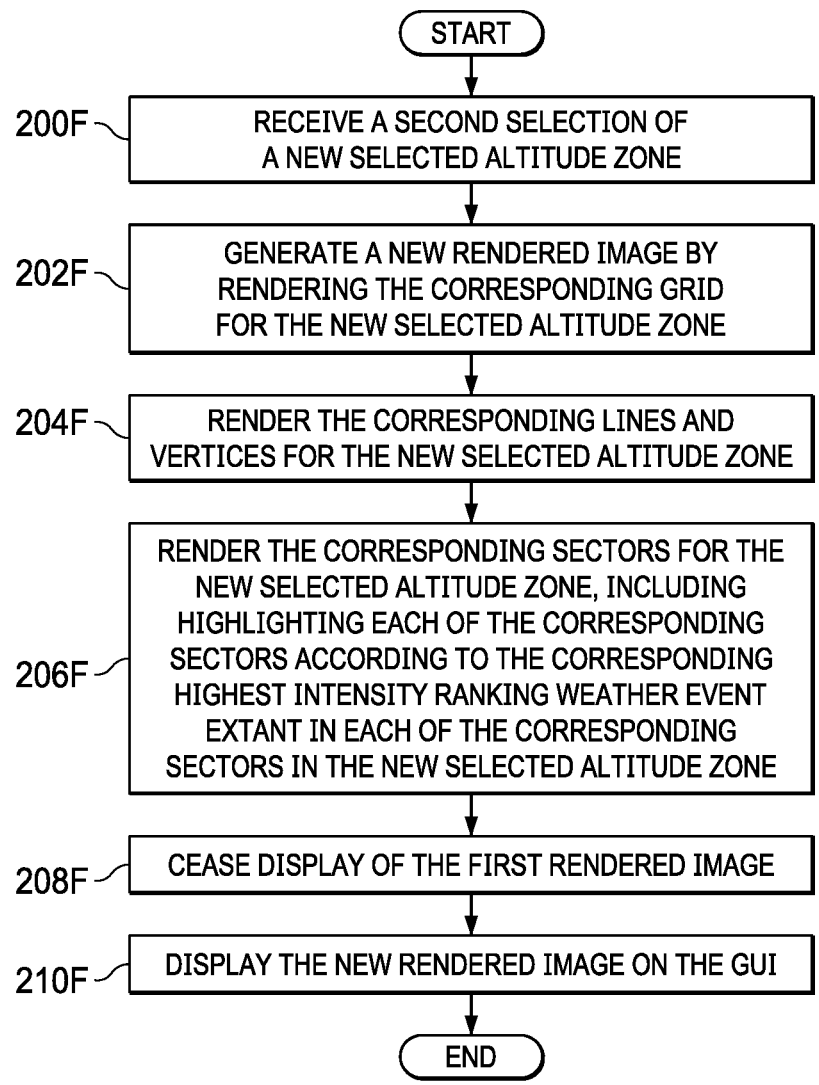

FIG. 2F shows a method of rendering a new grid after having rendered a previous grid. Thus, the method of FIG. 2F may be performed after the method of FIG. 2A. In this case, the rendered image in FIG. 2F may be characterized as a first rendered image.

At step 200F, a second selection of a new selected altitude zone is received. The new selected altitude zone may be received as described with respect to step 208 of FIG. 2A.

At step 202F, after receiving the new selected altitude zone at step 200F, a new rendered image is generated by rendering the corresponding grid for the new selected altitude zone. Rendering at step 202F may be accomplished using step 204F through 210F, as described below.

At step 204F, the corresponding lines and vertices for the new selected altitude zone are rendered. Rendering the lines and vertices may be accomplished as described with respect to step 200B of FIG. 2B.

At step 206F, the corresponding sectors for the new selected altitude zone are rendered, including highlighting each of the corresponding sectors according to the corresponding highest intensity ranking weather event extant in each of the corresponding sectors in the new selected altitude zone. Rendering the corresponding sectors for the new selected altitude zone may be accomplished as described with respect to step 202B of FIG. 2B.

At step 208F, display of the first rendered image is ceased. Thus, the first rendered image is no longer displayed on the GUI. Instead, at step 210F, the new rendered image is displayed on the GUI. Displaying the new rendered image may be as described with respect to step 212 of FIG. 2A. In other words, a grid for only one altitude zone at a time may be displayed. In one embodiment, the method of FIG. 2F may terminate thereafter.

The one or more embodiments described with respect to FIG. 2A through FIG. 2F may be varied. For example, with respect to FIG. 2F, step 208F may be skipped or varied. In other words, it is possible to display the grids of multiple altitude zones at the same time, or to display portions of grids of multiple altitude zones at the same time. An example of such a view is shown with respect to FIG. 15. Thus, the one or more embodiments may be varied, and the examples shown above with respect to FIG. 2A through FIG.

2F do not necessarily limit the other embodiments described herein or recognized by those of ordinary skill in the art.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Thus, the one or more embodiments are not necessarily limited by the examples provided herein.

Figure 3:
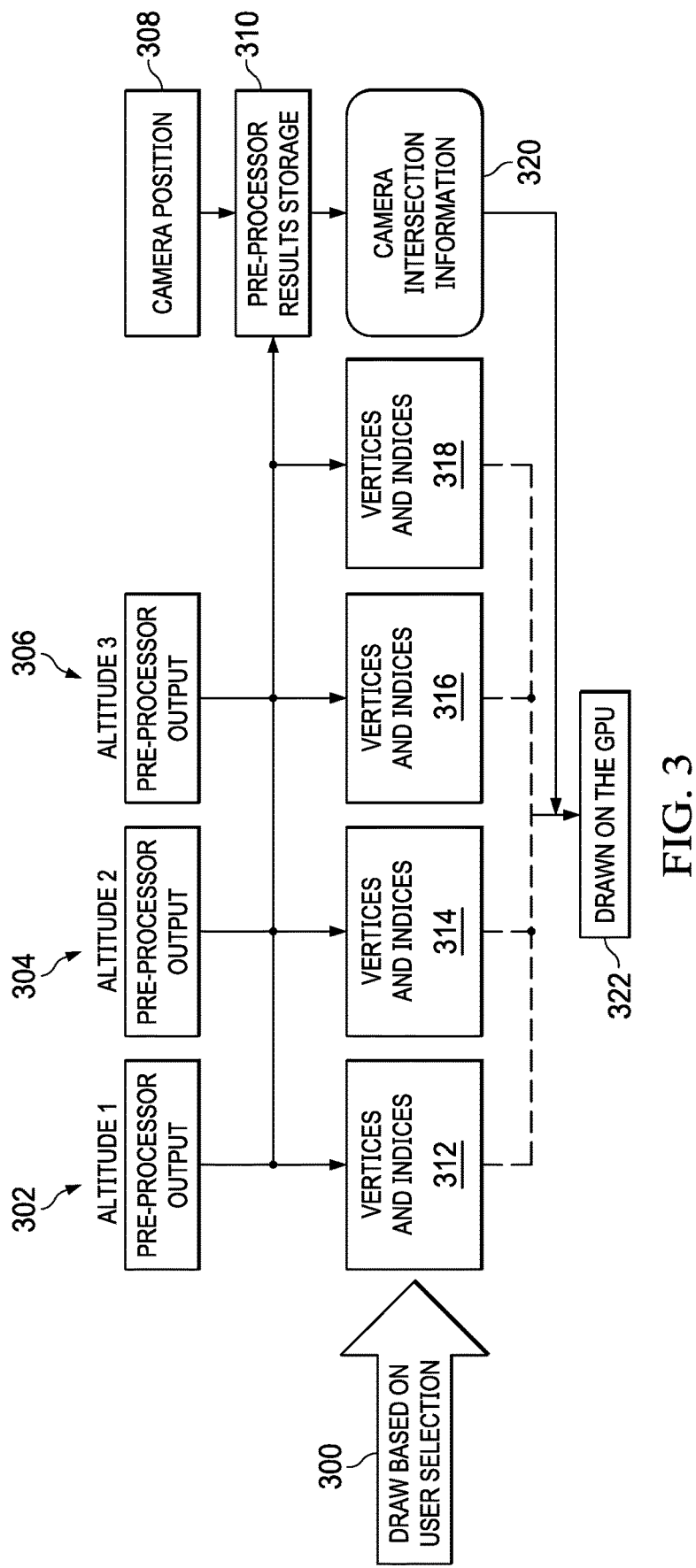
FIG. 3 shows a method for rendering weather information for display, in accordance with one or more embodiments of the invention.

FIG. 3 shows a method for rendering weather information for display, in accordance with one or more embodiments of the invention. In particular, FIG. 3 shows a method of efficiently rendering portions of multiple grids at multiple altitude zones, as shown in FIG. 15. The method shown in FIG. 3 may be performed using a rendering engine, such as rendering engine (166) in FIG. 1.

Initially, user input (300) is received. The user input (300) indicates portions of multiple altitude zones are to be shown on the GUI. The user input (300) may be received in the form of settings, or may be received as a specific command given at the time the rendering is to be performed. The number of altitude zones shown may be pre-determined, or may be determined based on the camera point from which the GUI will be rendered.

Next, the rendering engine, such as rendering engine (166) in FIG. 1, receives input data from multiple altitude zones. In particular, the pre-processing program outputs (e.g., the processed weather data from the pre-processing program (164) in FIG. 1) at altitude zone 1 (302), altitude zone 2 (304), and altitude zone 3 (306) are received at the rendering engine.

A camera position (308) is received relative to the reference system established for the image to be rendered. In conjunction with accumulated (for each altitude) pre-processing program results (310) stored in a data repository, the vertices and indices of the grid are drawn for each portion of an altitude zone to be rendered, such as vertices and indices (312), vertices and indices (314), vertices and indices (316), and vertices and indices (318). Camera intersection information (320) may also be taken into account. The rendered image is then drawn by the graphics processor unit (GPU), as shown at step (322).

FIG. 4 through FIG. 15 present specific example screenshots of graphical user interfaces (GUIs) rendered according to the techniques described above with respect to FIG. 1 and FIG. 2. Reference numerals in common between FIG. 4 through FIG. 15 refer to common objects that have common definitions. The following examples are for explanatory purposes only and not intended to limit the scope of the other examples described herein. Note that the screenshots shown in FIG. 4 through FIG. 15 each represent a different example of a rendered image, such as rendered image (134) in FIG. 1.

GUI (400) is a screenshot taken from a camera point that is above and behind the reference point (402), and turned somewhat to the left. The flight path (404) is shown. The grid (406) is shown for a selected altitude zone (408). The selected altitude zone (408) is shown on a slide bar (410), which a user may manipulate to select different altitude zones.

As shown, the grid (406) forms square sectors. The sectors are filled with differently colored sectors. Some sectors, such as sector (412), are colored one color to indicate the presence of one degree of maximum turbulence. In other sectors, such as sector (416), a different color is present. The different color indicates that a higher degree of turbulence is present. Thus, both in sector (412) and in sector (416), turbulence is displayed as highlighting in the sectors, with the different colors (hash patterns) representing the degree of turbulence.

Additional information may be presented in the GUI (400). For example, the current altitude and time of day may be shown in the screen area (418). The time may reflect the time that the aircraft is expected to be at the shown location. In other words, the one or more embodiments contemplate showing a future projected position of the aircraft and the expected weather at that future position at a future time.

The selected altitude zone (408) may show the predominate type of weather event, as well as the altitude zone selected. In this case, the selected altitude zone is 9000 feet, meaning that the grid (406) shown is at 9000 feet. Note that the selected altitude zone (408), and thus the grid (406) shown (9000 feet), is different than the current altitude of the reference point (currently at 15,000 feet, as shown in the screen area (418)). Thus, the GUI (400) shows the reference point (402) as being above the grid (406).

Still other information may be shown, such as the ground terrain (420), time and distance scale (422), current flight plan (424), and user interaction icons, such as icon (426), icon (428), and icon (430). Still other information could be presented, and thus the example shown in FIG. 4 does not limit other examples.

Figure 4:
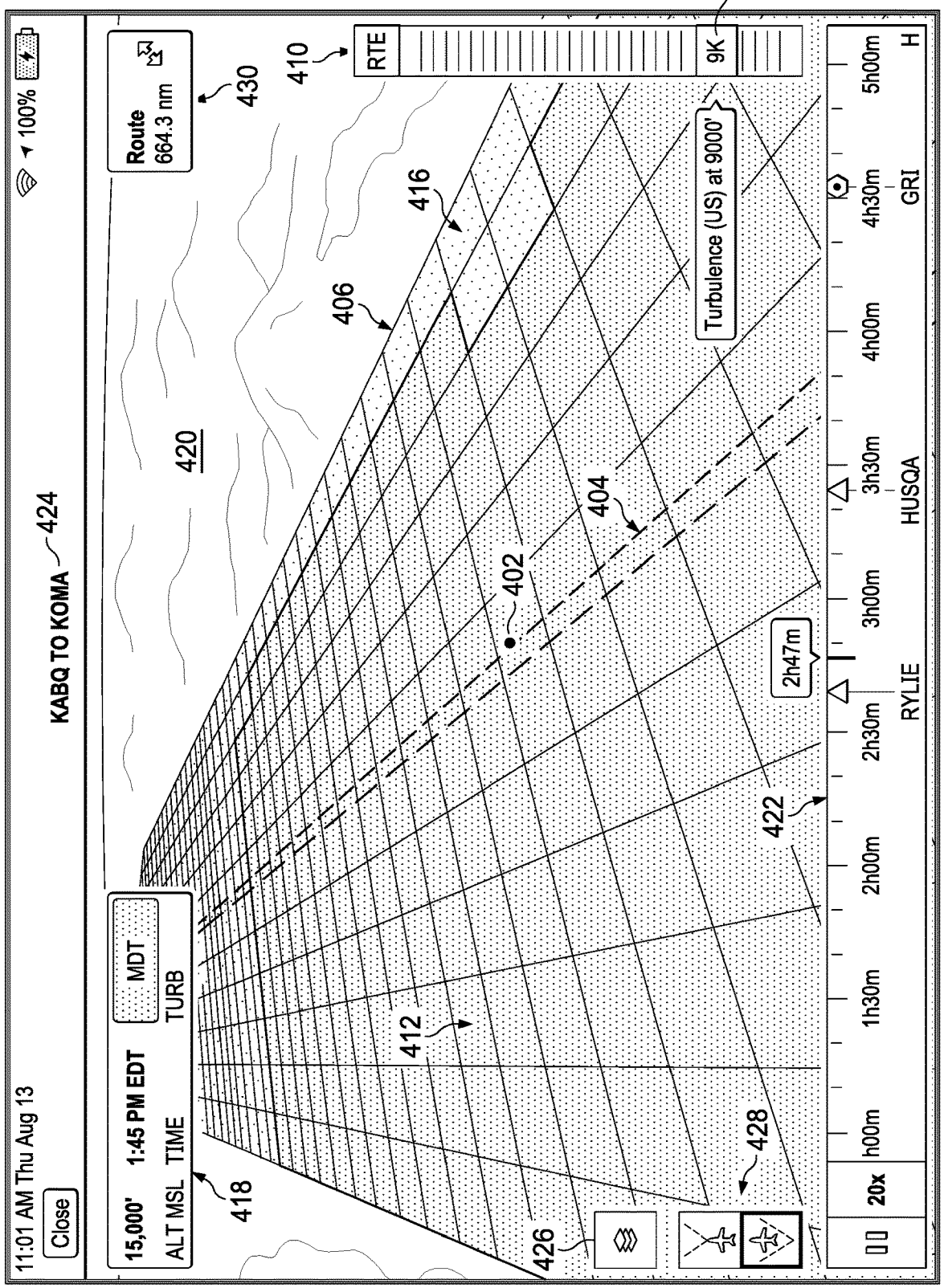
FIG. 4, FIG. 5, FIG. 6, FIG. 7, FIG. 8, FIG. 9, FIG. 10, FIG. 11, FIG. 12.
Figure 5:
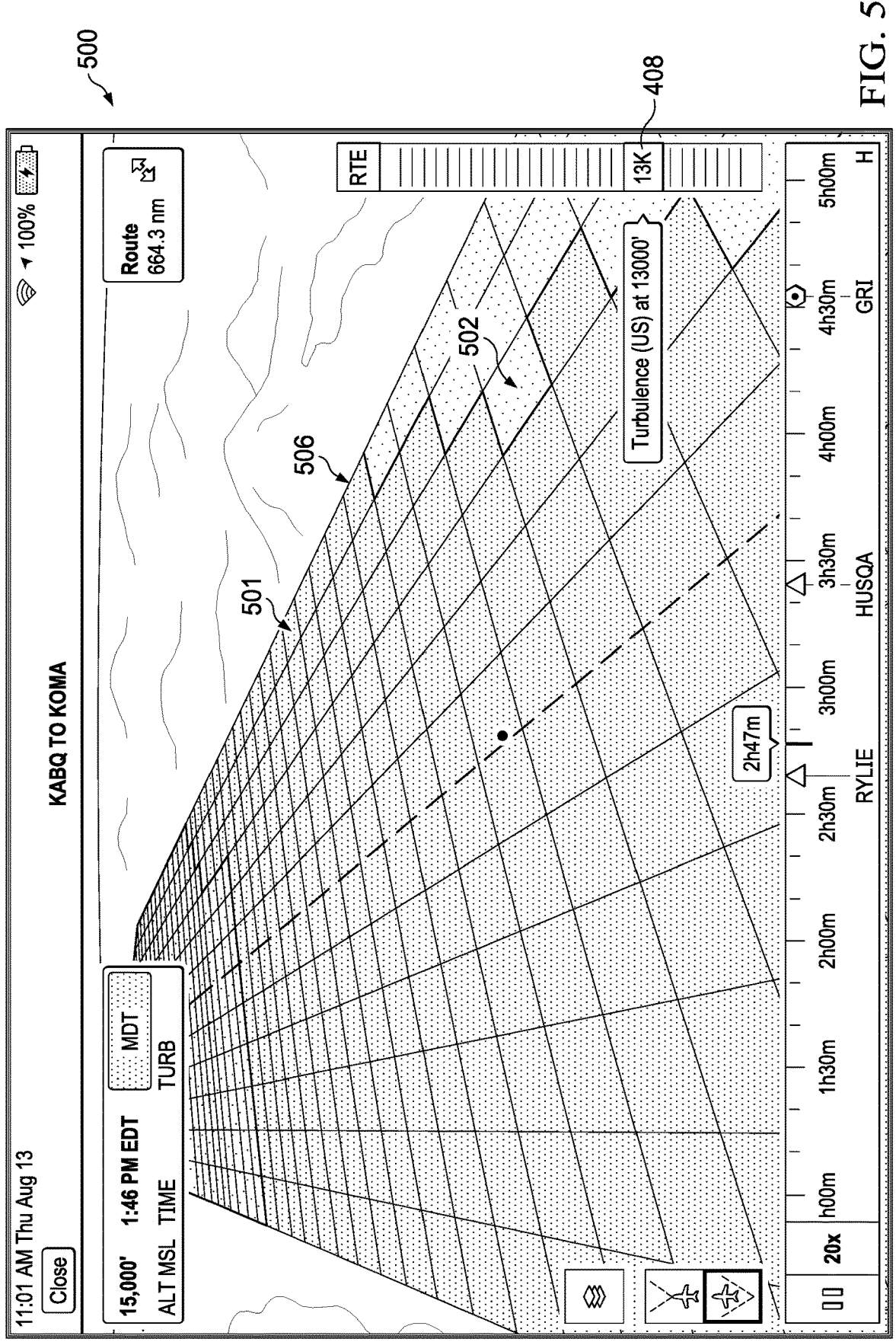

Attention is now turned to FIG. 5. The GUI (500) is similar to the GUI (400) shown in FIG. 4. The difference between the two figures derives from the fact that the selected altitude zone (408) is now shown at 13,000 feet in FIG. 5 instead of at 9,000 feet, as shown in FIG. 4. The camera angle remains the same. Note that the reference point remains at 15,000.

However, some of the sectors have changed highlighting. For example, sector (500) is now highlighted to show that more intense turbulence is present in sector (500), relative to the same sector shown in FIG. 4. In contrast, sector (502) is now highlighted to show a lower intensity of turbulence, relative to the same sector shown in FIG. 4. In other words, the grid (506) shown in the GUI (500) shows the degrees of turbulence at 13,000 feet, instead of the degrees of turbulence at 9,000 feet.

In an embodiment, the user selects which type of weather event to display as highlighted sectors in the grid (506). In this case, the color, hashing, or other highlighting of the sectors represent the degree of intensity of the selected weather event.

In an alternative embodiment, only the most intense weather type is shown for the whole grid, or optionally for one or more sectors within a grid. By showing only the most intense weather events in a sector at a selected altitude zone, a pilot can quickly review the most relevant weather information at a variety of different altitude zones. Regardless of which technique is applied to display information about weather types, the information may be presented in a compact and efficient form on a small screen of a mobile device or onboard computer display.

Figure 6:
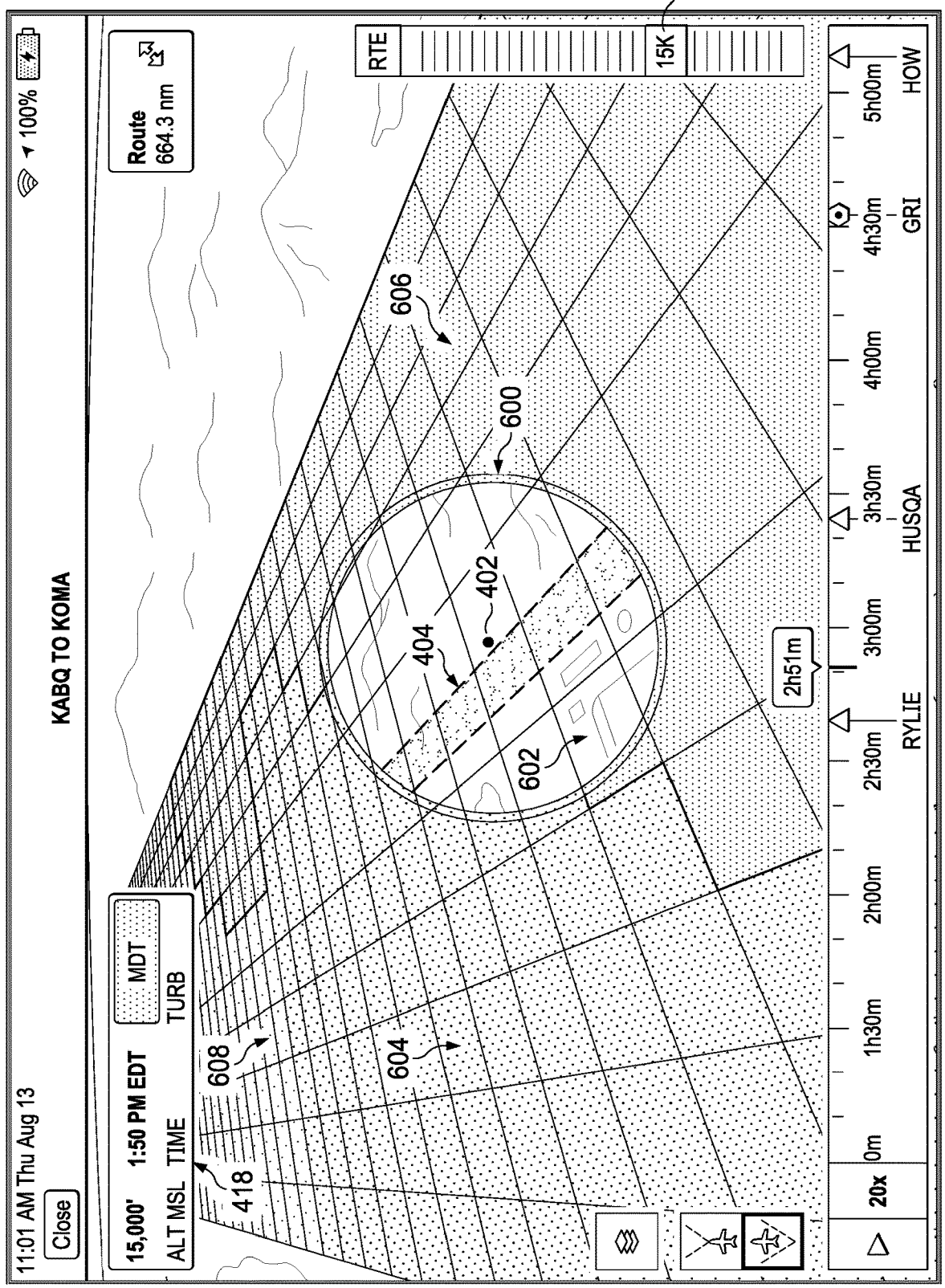

Attention is now turned to FIG. 6. In FIG. 6, a new selected altitude zone (408) has been selected to be at 15,000 feet. As shown in the screen area (418), the reference point is at 15,000 feet. Thus, the selected altitude zone (408) is at the same altitude as the reference point (402).

Because the reference point (402) would be hidden by the highlighting present in the sector in which the reference point (402) is located, a sub-area (600) is defined around the reference point (402). Highlighting of sectors, or portions of sectors, within the sub-area (600) is avoided. Thus, the pilot may view the reference point (402), the flight path (404), and landmarks (602) that are present within the sub-area (600). The sub-area (600) is bounded by a solid line, because the reference point (402) is inside the hidden weather in the sub-area (600).

FIG. 6 also shows that the most intense weather sectors of a given weather type are different at 15,000 feet, relative to either the most intense weather sectors of the given weather type at 9,000 feet or 13,000 feet. For example, sector (604) is highlighted to show that the most intense weather type in that sector at 15,000 feet is turbulence. The color (represented by hashing) of the sector (604) is a more intense shade (more dense hashing) than other sectors, such as sector (606), where turbulence is also present, but less severe. In other words, in both sector (604) and in sector (606), turbulence is the weather type being displayed. However, the turbulence in sector (604) is more intense than the turbulence in sector (606). Thus, additional relevant information may be shown on a small screen in a manner that a pilot may quickly interpret.

Additionally, in sector (608), turbulence remains the weather type shown. However, the different shading indicates that the turbulence in sector (608) is less severe than in either sector (604) or sector (606).

In an embodiment, the user (or rendering program) may select which type of weather event to display. Thus, for example, the user could switch from showing the turbulence weather type in FIG. 6 to an icing weather type in FIG. 6. Doing so causes the rendering engine to re-draw the grid shown in FIG. 6, but now the sectors would be highlighted according to the intensity of icing conditions.

In an alternative embodiment, only the most intense type of weather is shown in a given sector. Thus, for example, if both icing and turbulence are present in a sector, but turbulence is more intense, then only the turbulence is shown.

In yet another alternative embodiment, multiple highlighting schemes may be used in a single sector. For example, in half of the sector (608) one color or highlighting scheme may be used, and in the other half the sector (608) another color or highlighting scheme may be used. This variation is not shown in FIG. 6.

Figure 7:
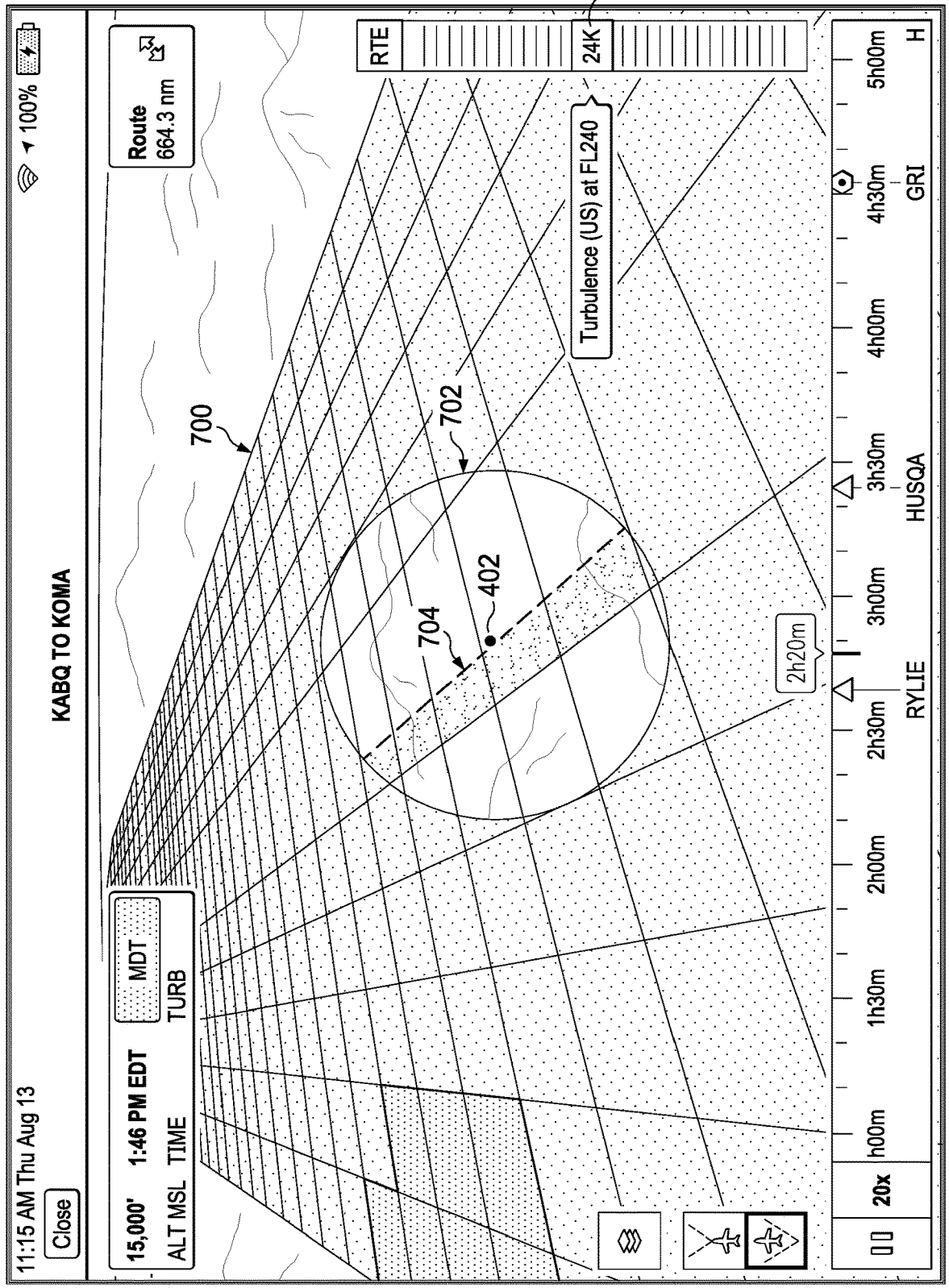

Attention is now turned to FIG. 7. In FIG. 7, the selected altitude zone (408) is 24,000 feet, which is above the altitude of the reference point (402) at 15,000 feet. Note that the scale of the grid (700) is increased relative to the other grids in order to give the user the perspective that the grid (700) is closest to the user because the selected camera point is behind the hidden weather in the sub-area (702).

Again, the sub-area (702) is an area in which highlighting of the sectors is avoided. However, unlike the sub-area (600) shown in FIG. 6, the rim of the sub-area (702) is shown as a soft gradient because the camera point is behind hidden weather in the sub-area.

Additionally, the shading or colors showing the highlighting of sectors in the grid (700) have changed relative to the grids shown in FIG. 4 through FIG. 6. In particular, it can be seen that the predominate most intense weather types at 24,000 feet are icing conditions, rather than turbulence at 15,000 feet at which the reference point (402) is flying (as shown in FIG. 6).

Another variation of the one or more embodiments is also shown in FIG. 7. In particular, the highlighting (e.g., color, hashing, etc.) of the most intense weather type may be applied to the current flight path (704) of the reference point (402). Thus, for example, the line representing the current flight path (704) is highlighted with the same highlighting (e.g. color) of the sector in which the reference point (402) is located in FIG. 6. Recall that, in FIG. 6, the selected altitude is also the current altitude of the reference point (402). Referring back to FIG. 6, it can be inferred that the current sector in which the reference point (402) is located is a first highlighting type (e.g., "yellow") to indicate that the most intense weather type in the sector in which the reference point (402) is located is turbulence. As can be seen in FIG. 7, the current flight path (704) has the same highlighting (e.g., "yellow"). Thus, the pilot can quickly see that at the current altitude of the reference point (402) the most intense weather type is turbulence at a first specific degree of intensity, but that at the selected altitude zone (408) for FIG. 7, the turbulence is present but at a second degree of intensity that is significantly less. Accordingly, the pilot might decide to seek permission from a regulatory authority to change the flight plan and increase the altitude of the reference point (402) from 15,000 feet to 24,000 feet.

Figure 8:
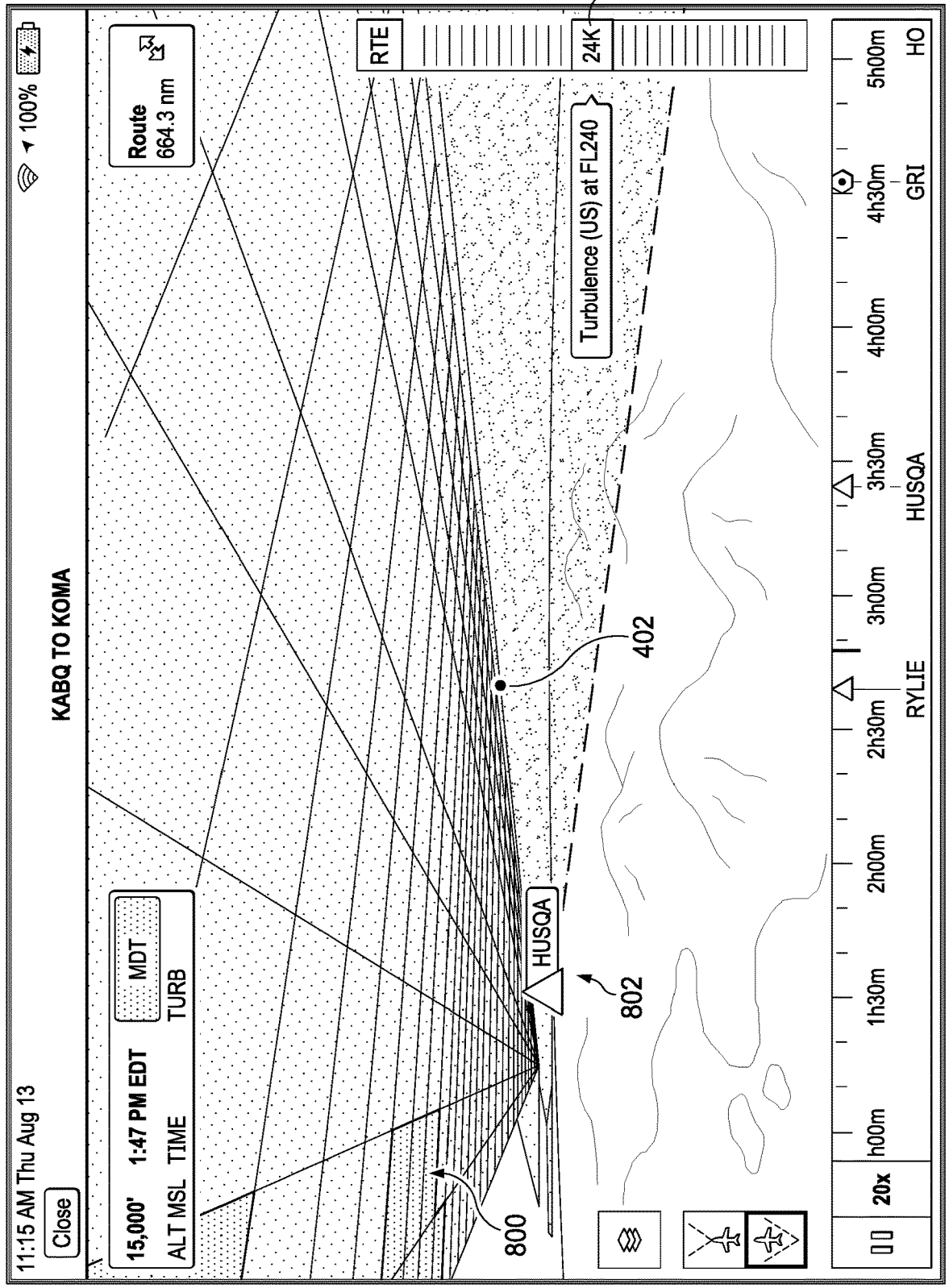

Attention is now turned to FIG. 8. In FIG. 8, the camera point has changed, though the selected altitude zone (408) remains at 24,000 feet, relative to FIG. 7. In particular, the user has, by dragging the screen or interacting with some other widget on the GUI, changed the camera point to be under and two the left of the reference point (402). However, because the selected altitude zone (408) is the same in FIG. 8 as in FIG. 7, the grid (800) is the same as the grid (700) shown in FIG. 7 and conveys the same sectors with the same highlighting. However, because the camera point has changed, the perspective of the grid (800) is different than the grid (700) in FIG. 7, even though the information in the two grids is the same.

Note, for example, how the grid (800) appears to be viewed from the new vantage point. Additionally, the sub-area (702) shown in FIG. 7 is no longer present in FIG. 8 because the reference point (402) is no longer inside the weather types being shown in the grid (800). From the vantage of the camera point shown in FIG. 8, a waypoint (802) can also be seen.

Attention is now turned to FIG. 9. The grid (900) is now shown from a still different camera point, rotated to the left relative to the camera appoint shown in FIG. 8. In addition, as shown in the screen area (418), the current altitude of the reference point (402) is at 19,000 feet. However, the grid (900) being shown is for the selected altitude zone (408) is at 16,000 feet. Thus, the reference point (402) has increased in altitude, but the selected altitude zone (408) has decreased in altitude.

Due to the line of sight between the camera point and the reference point (402), the reference point (402) would have been hidden by the highlighting of the sectors of the grid (900). Thus, a new sub-area (904) is shown in which the sectors, or portions of sectors, are not highlighted. The sub-area (904), or cut-out area, is a partial circle in this example because the bottom part of the sub-area (904) is below the lower surface of the grid (900) for the selected altitude zone (408). The shading, or hash pattern, of the sectors of the grid (900) indicate that icing is the most intense weather type in the sectors of the grid (900), with more intense colors or heavier hash patterns indicating that the icing conditions are more intense in some sectors relative to others at the selected altitude zone (408).

Attention is now turned to FIG. 10. As shown in the screen area (418), the altitude of the reference point (402) remains at 19,000 feet. However, now the selected altitude zone (408) is now at 19,000 feet (i.e., the same altitude as the reference point (402)). Additionally, the camera point has been adjusted to be over the reference point (402).

Accordingly, the grid (1000) is shown as if looking down on the grid (1000). A sub-area (1002) in which sectors are not highlighted is present because the reference point (402) otherwise would have been hidden by the highlighting. The grids in the sub-area (1002) are rendered, but the highlighting of the sectors is avoided within the sub-area (1002). The color, intensity, and hash type or hashing intensity show that varying degrees of icing conditions exist as the most intense weather types in various sectors in the grid (1000).

Figure 11:
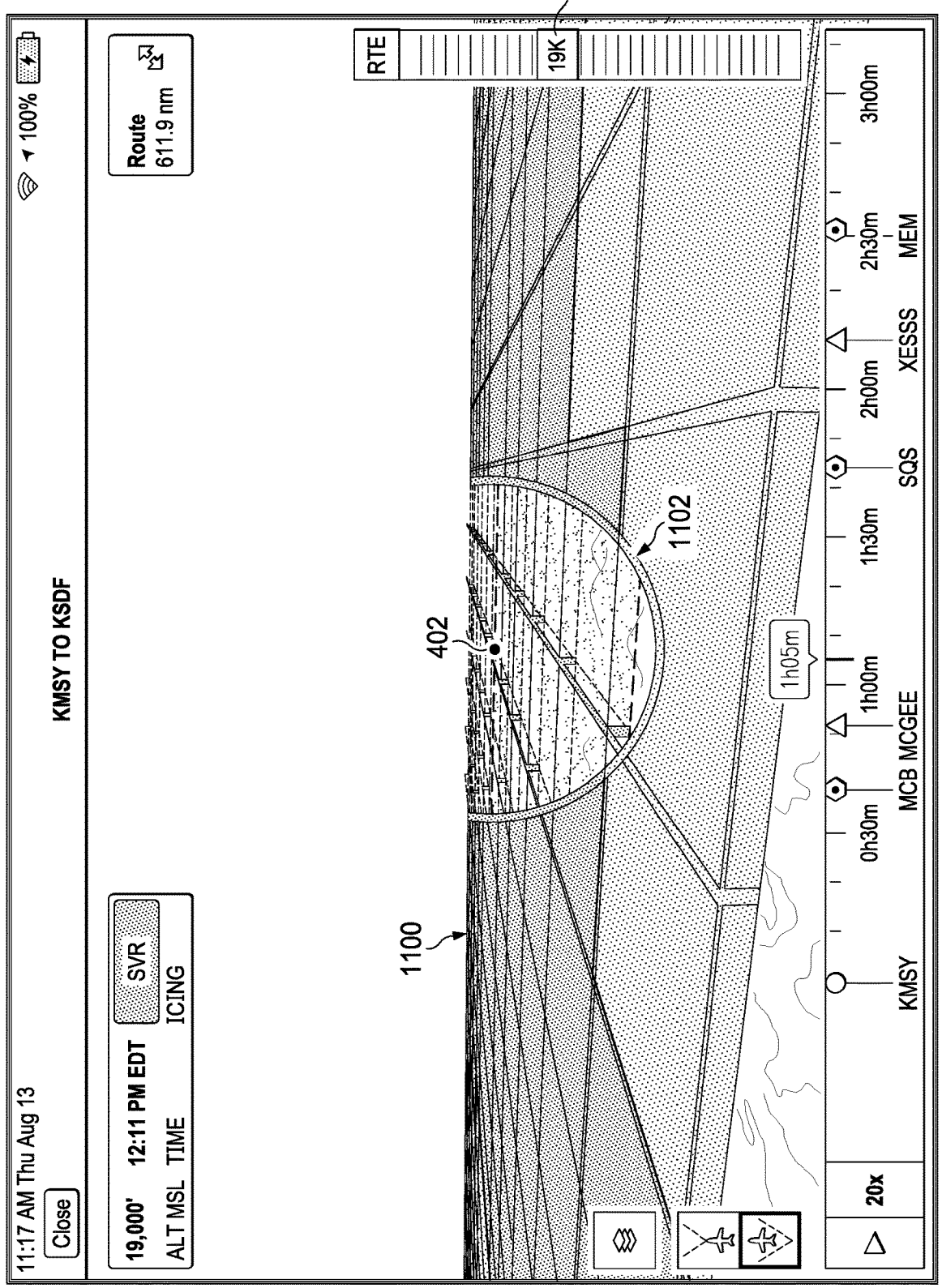

Attention is now turned to FIG. 11. As with FIG. 10, the reference point (402) remains at 19,000 feet and the selected altitude zone (408) remains at 19,000 feet. Thus, the grid (1100) is the same as the grid (1000) with respect to which sectors display what kind of highlighting. However, in FIG. 10, the camera point has changed, perhaps by the user dragging the screen around to rotate the camera point in three-dimensions.

As a result, the rendered image of the grid (1100) is shown at a relatively shallow angle. Accordingly, the sub-area (1102) which is not highlighted is only partially circular, ending at the upper boundary of the grid (1100).

Figure 12:
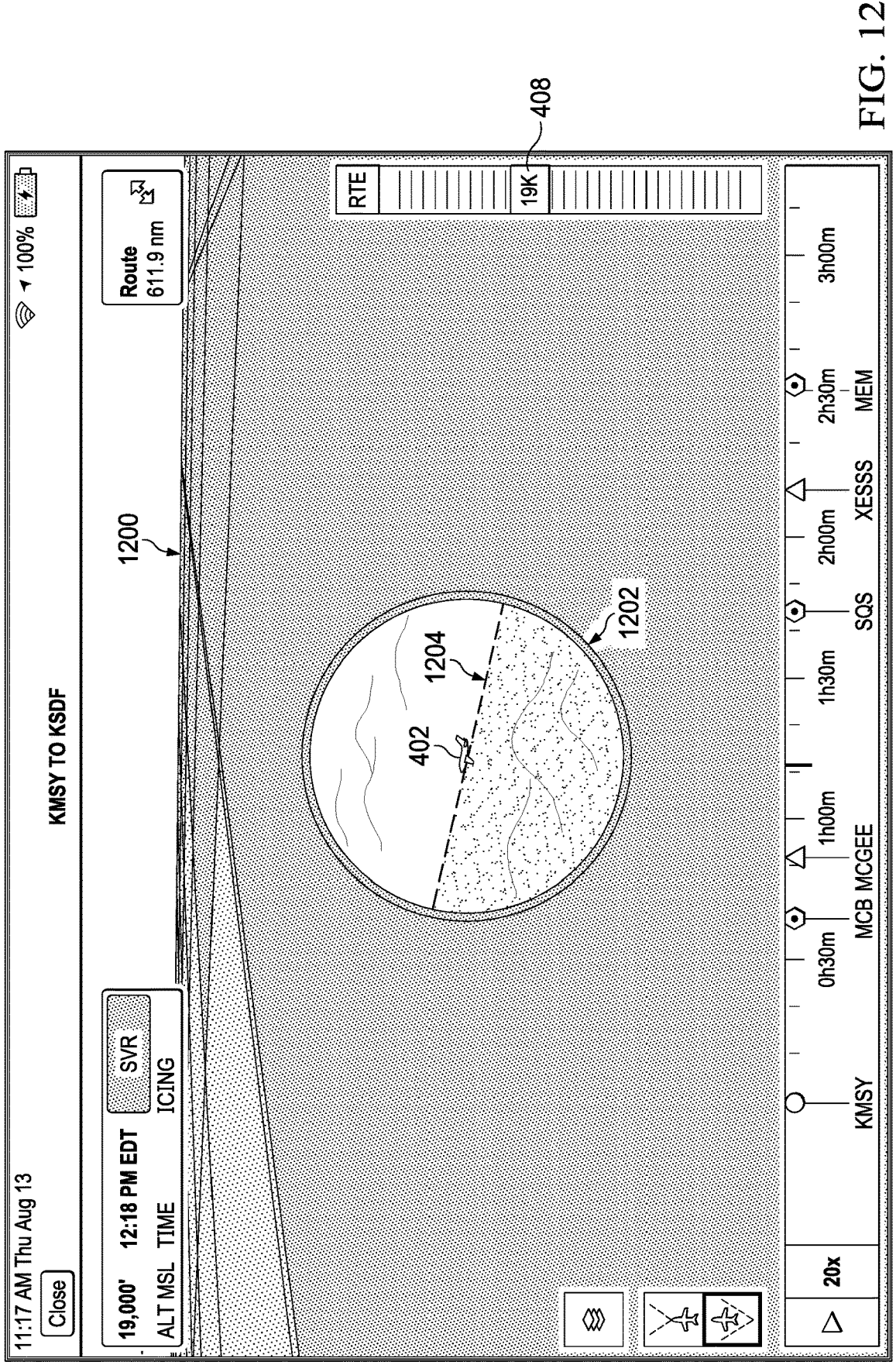

Attention is now turned to FIG. 12. As with FIG. 10 and FIG. 11, the reference point (402) remains at 19,000 feet and the selected altitude zone (408) remains at 19,000 feet. However, the camera point has again changed, this time zooming in more closely on the reference point (402), relative to FIG. 10 and FIG. 11. Because the camera point has zoomed in, the sectors appear larger. However, the sectors in grid (1200) have the same highlighting patterns as the sectors in grid (1000) of FIG. 10 and grid (1100) in FIG. 11, and represent the same relative physical areas.

Again, because the highlighting within the grid (1200) would hide the reference point (402), highlighting in the sub-area (1202) is avoided. Note that the flight path (1204) of the reference point (402) is thus also visible in the sub-area (1202).

Attention is now turned to FIG. 13. As with FIG. 10 through FIG. 12, the reference point (402) remains at 19,000 feet and the selected altitude zone (408) remains at 19,000 feet. However, the camera point has again changed, this time zooming in even more closely on the reference point (402), relative to FIG. 12. Because the camera point has zoomed in, the sectors appear larger still, relative to FIG. 12. However, the sectors in grid (1300) have the same highlighting patterns as the sectors in grid (1000) of FIG. 10, grid (1100) in FIG. 11, and grid (1200) in FIG. 12, representing the same relative physical areas.

However, in FIG. 13, the camera point has zoomed in so closely to the reference point (402) that the camera point has entered the grid (1300). Thus, the entire rendered grid (1300) is shown without highlighting. In effect, in the example of FIG. 13, the entire grid is shown as being within a sub-area, and thus highlighting is avoided. Nevertheless, highlighted bars, such as highlighted bar (1304) may be rendered next to the lines and vertices (1306) in order to indicate visually the highest intensity weather type associated with a given sector. Note that the highlighted area (1308) represents the flight path of the reference point (402), and occupies more area on the screen due to the camera point being zoomed-in on the reference point (402).

Figure 14:
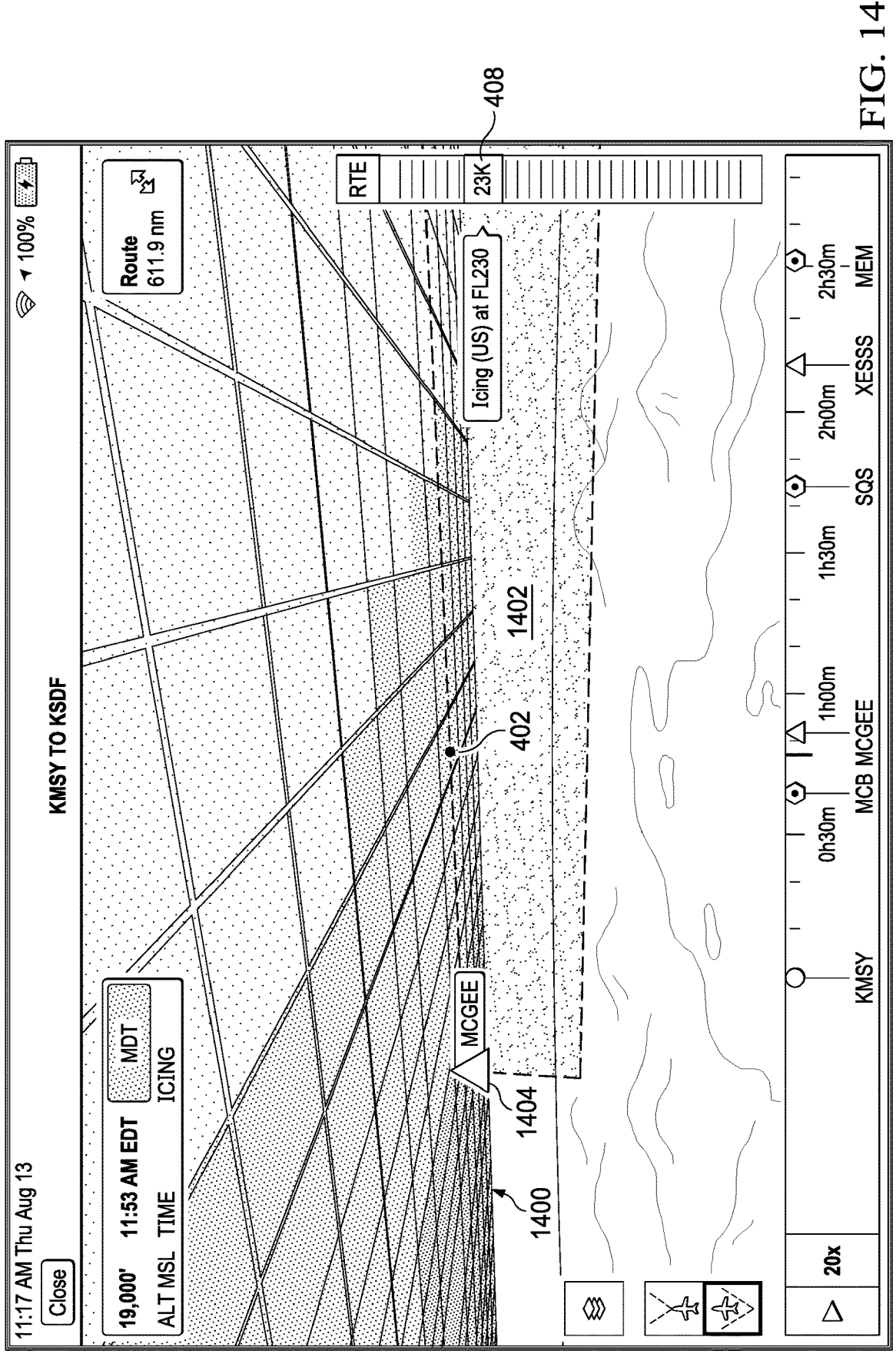

Attention is now turned to FIG. 14. In FIG. 14, the reference point (402) remains at 19,000 feet. However, now the selected altitude zone (408) is 23,000 feet (i.e., above the reference point (402)). Additionally, the camera point has moved to be below the reference point (402), and zoomed-out relative to the view shown in FIG. 13.

Thus, the grid (1400) is shown above the reference point (402). No sub-area without highlighting is present in the example of FIG. 14, because the reference point (402) is not hidden by the highlighting of the sectors of the grid (1400). Again, the type of highlighting indicates the type and relative intensity of the highest intensity weather event within any given sector. In the example of FIG. 14, again, icing conditions predominate throughout the sectors in the grid (1400). However, the different highlighting indicates that icing conditions are more intense in certain sectors than in other sectors.

Other information is shown. For example, a highlighted plane (1402) indicates the flight path of the reference point (402). A waypoint (1404) along the flight path is also shown.

Attention is now turned to FIG. 15. In the example of FIG. 15, the reference point (402) is at 6,004 feet, and is descending, as shown by flight path (1500). The selected altitude zone (408) is 6,000 feet, which is the altitude zone selected for the current altitude of the reference point (402).

FIG. 15 shows that multiple grids may be shown, particularly when the reference point (402) is climbing or descending. The examples in FIG. 4 through FIG. 14 showed the reference point (402) at cruising flight paths.

Thus, as shown in FIG. 15, the grid (1502) need not be all displayed at the selected altitude zone (408). Instead, each grid row may display the most intense weather conditions at the subsequent grid or the previous grid, relative to the flight path (1500) of the reference point (402). As a result, what is displayed is a step grid, which is useful for the pilot to see the most intense weather types the pilot has just flown through, and should anticipate while following the flight path (1500). In this example, the highlighting reflects turbulent conditions during ascent. From viewing the GUI in FIG. 15, the pilot can readily see that the turbulent conditions are relatively constant, and thus the conditions during ascent should be similar to the conditions through which the pilot has already flown.

To render the grid (1502), the rendering engine forms a series of grids at different altitude zones centered on the selected altitude zone (408). Thus, for example, a one by nine grid is formed for each altitude zone behind and in front of the selected altitude zone (408) relative to the flight path (1500). The highlighting in each sector reflects the most intense weather condition type in that particular sector. Because any given sector is for a given altitude, the steps in the grid (1502) show the expected weather most intense weather types as the reference point (402) descends through multiple altitude zones.

Again, because the highlighting in at least some the sectors would hide the reference point (402), a sub-area (1504) is drawn around the reference point (402). Highlighting is avoided in sectors inside the sub-area (1504), in order to more clearly show the reference point (402) and the flight path (1500). Additionally, the underlying terrain (1506) can also be seen within the sub-area (1504). In this example, the underlying terrain (1506) is water, as the aircraft is approaching a landing runway from over an adjoining body of water.

Still other variations are possible. Thus, the one or more embodiments are not limited by the example GUI screenshots shown in FIG. 4 through FIG. 15. Other variations are possible, including differently sized sub-areas, grids that step downwardly during descent (instead of upwardly during ascent as shown in FIG. 15), multiple types of highlighting in a single sector, etc. In still another variation, a user may be able to input which type of weather event the user desires to see highlighted in the grid. Thus, for example, the user need not view only the most intense weather type in a sector, but may see variations in intensity in a user-selected weather type (e.g., icing conditions). Many other variations are possible.

Figure 16A:
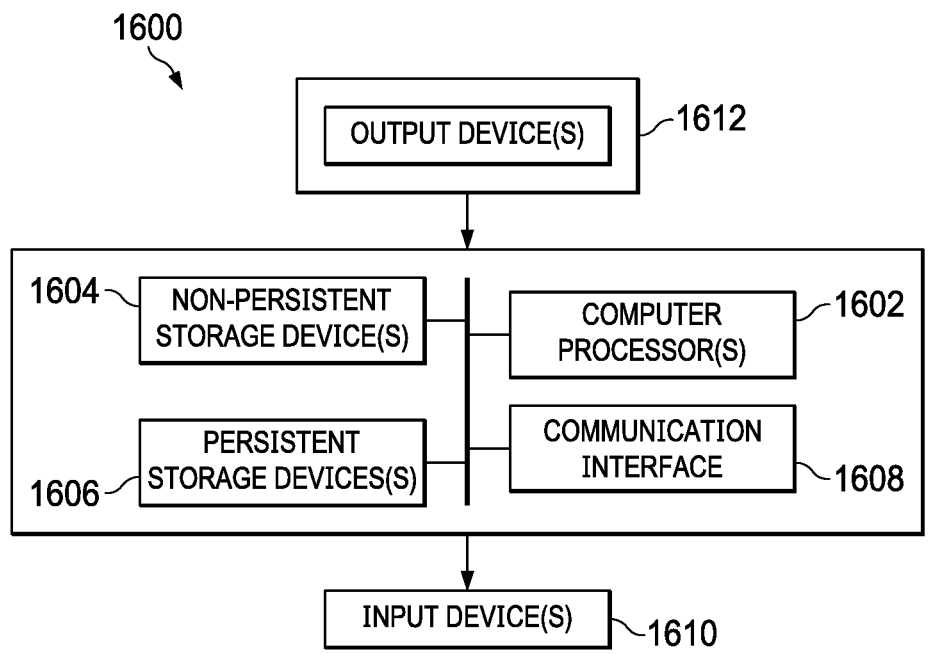
FIG. 16A and FIG. 16B are a computing system and a network environment, in accordance with one or more embodiments of the invention.
Figure 16B:
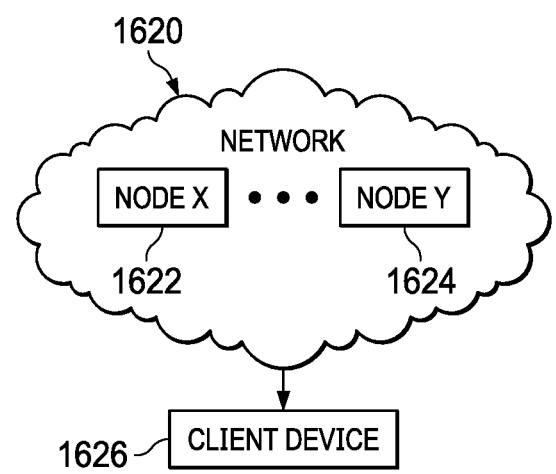

FIG. 16A and FIG. 16B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 16A, the computing system (1600) may include one or more computer processor(s) (1602), non-persistent storage device(s) (1604) (e.g., volatile memory, such as random access memory (RAM), cache memory), persistent storage device(s) (1606) (e.g., a hard disk, an optical drive such as a compact disk (CD) drive or digital versatile disk (DVD) drive, a flash memory, etc.), a communication interface (1608) (e.g., Bluetooth interface, infrared interface, network interface, optical interface, etc.), and numerous other elements and functionalities that implement the features and elements of the disclosure.

The computer processor(s) (1602) may be an integrated circuit for processing instructions. For example, the computer processor(s) (1602) may be one or more cores or micro-cores of a processor. The computing system (1600) may also include one or more input device(s) (1610), such as a touchscreen, a keyboard, a mouse, a microphone, a touchpad, an electronic pen, or any other type of input device.

The communication interface (1608) may include an integrated circuit for connecting the computing system (1600) to a network (not shown) (e.g., a local area network (LAN), a wide area network (WAN) such as the Internet, a mobile network, or any other type of network) and/or to another device, such as another computing device.

Further, the computing system (1600) may include one or more output device(s) (1612), such as a screen (e.g., a liquid crystal display (LCD), a plasma display, a touchscreen, a cathode ray tube (CRT) monitor, a projector, or other display device), a printer, an external storage, or any other output device. One or more of the output device(s) (1612) may be the same or different from the input device(s) (1610). The input and output device(s) (1610 and 1612) may be locally or remotely connected to the computer processor(s) (1602), the non-persistent storage device(s) (1604), and the persistent storage device(s) (1606). Many different types of computing systems exist, and the aforementioned input and output device(s) (1610 and 1612) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1600) in FIG. 16A may be connected to or be a part of a network. For example, as shown in FIG. 16B, the network (1620) may include multiple nodes (e.g., node X (1622), node Y (1624)). Each node may correspond to a computing system, such as the computing system (1600) shown in FIG. 16A, or a group of nodes combined may correspond to the computing system (1600) shown in FIG. 16A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1600) may be located at a remote location and connected to the other elements over a network.

Although not shown in FIG. 16B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1622), node Y (1624)) in the network (1620) may be configured to provide services for a client device (1626). For example, the nodes may be part of a cloud computing system. The nodes may include functionality to receive requests from the client device (1626) and transmit responses to the client device (1626). The client device (1626) may be a computing system, such as the computing system (1600) shown in FIG. 16A. Further, the client device (1626) may include and/or perform all or a portion of one or more embodiments of the invention.

The computing system (1600) or group of computing systems described in FIGS. 16A and 16B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (1600) in FIG. 16A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (1600) of FIG. 16A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (1600) in FIG. 16A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (1600) of FIG. 16A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (1600) of FIG. 16A and the nodes (e.g., node X (1622), node Y (1624)) and/or client device (1626) in FIG. 16B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of presenting weather data on a graphical user interface (GUI), the method comprising:
   assigning a corresponding intensity rank to each of a plurality of weather events, wherein the plurality of weather events is based on the weather data and wherein at least one of the plurality of weather events is present in at least one of a plurality of altitude zones defined for a physical area centered on a reference point;
   dividing each of the plurality of altitude zones into a corresponding grid defined for the physical area, each corresponding grid comprising corresponding sectors defined by corresponding lines and vertices;
   assigning, to each of the corresponding sectors in the plurality of altitude zones, a corresponding highest intensity ranking weather event extant in the corresponding sectors;
   receiving a selection of a selected altitude zone from among the plurality of altitude zones;
   generating a rendered image by rendering the corresponding grid for the selected altitude zone; and
   displaying the rendered image on the GUI.

2. The method of claim 1, wherein rendering further comprises:
   rendering the corresponding lines and vertices for the selected altitude zone; and
   rendering the corresponding sectors for the selected altitude zone, including highlighting each of the corresponding sectors according to the corresponding highest intensity ranking weather event extant in each of the corresponding sectors in the selected altitude zone.

3. The method of claim 2, further comprising:
   before generating the corresponding sectors for the selected altitude zone, determining a location of a camera point relative to the reference point, wherein the camera point is a virtual point selected in the physical area at one of the plurality of altitude zones;
   determining whether a point of view of the corresponding grid from the camera point towards the reference point will be obstructed by highlighted sectors of the corresponding sectors;
   responsive to a determination that the point of view will be obstructed by highlighting, defining a sub-area in the corresponding grid; and as part of rendering the corresponding sectors, avoiding highlighting ones of each of the corresponding sectors that are in the sub-area in the corresponding grid.

4. The method of claim 3, further comprising:
prior to displaying the rendered image on the GUI, rendering, inside the sub-area in the corresponding grid, additional information relating to an aircraft located at a position determinable with respect to the rendered image.

5. The method of claim 4, wherein the additional information is selected from the group consisting of: an icon of the reference point, an icon of the aircraft, a flight path of the aircraft, an altitude of the aircraft, a speed of the aircraft, a waypoint along an intended flight path of the aircraft, a destination of the aircraft, landmarks on a surface beneath the reference point, and combinations thereof.

6. The method of claim 3, wherein the camera point is in a different altitude zone than the selected altitude zone.

7. The method of claim 3, further comprising:
after displaying, receiving a new camera point;
determining whether a new point of view of the corresponding grid from the new camera point towards the reference point will be obstructed by different highlighted sectors of the corresponding sectors;
responsive to a determination that the new point of view will be obstructed by highlighting, defining a new sub-area in the corresponding grid; and
as part of rendering the corresponding sectors, avoiding highlighting ones of each of the corresponding sectors that are in the new sub-area in the corresponding grid.

8. The method of claim 3, wherein the sub-area comprises a circle or a sphere.

9. The method of claim 3, further comprising:
only rendering the corresponding grid in the sub-area.

10. The method of claim 3, further comprising:
rendering a rim of the sub-area as a soft gradient when the camera point is behind hidden weather in the sub-area; and
rendering the rim of the sub-area as a solid line when the reference point is inside the hidden weather in the sub-area.

11. The method of claim 2, further comprising:
prior to displaying the rendered image on the GUI, rendering additional information relating to the reference point superimposed on the corresponding grid.

12. The method of claim 2, wherein highlighting is shown in color, and wherein at least two different sectors in the corresponding sectors have at least two different colors to show different highest intensity rankings in the at least two different sectors.

13. The method of claim 2, further comprising:
further rendering the corresponding sectors according to types of weather in the corresponding sectors.

14. The method of claim 13, wherein the types of weather are rendered as changes in the highlighting.

15. The method of claim 2, wherein highlighting is shown in color, and wherein at least two different sectors in the corresponding sectors have at least two different colors to show different highest intensity rankings in the at least two different sectors, and wherein the method further comprises:
further rendering the corresponding sectors according to types of weather in the corresponding sectors, wherein the types of weather are rendered as changes in the highlighting by changing at least one of an intensity, a transparency, or a shade of the at least two different colors.

16. The method of claim 2 wherein the corresponding lines and vertices form one of: a square grid, a hexagon grid, a triangle grid, a radial grid, an unstructured mesh grid, and a curved grid.

17. The method of claim 2, wherein the rendered image comprises a first rendered image, and wherein the method further comprises:
receiving a second selection of a new selected altitude zone;
after receiving the new selected altitude zone, generating a new rendered image by rendering the corresponding grid for the new selected altitude zone,
wherein rendering further comprises:
rendering the corresponding lines and vertices for the new selected altitude zone; and
rendering the corresponding sectors for the new selected altitude zone, including highlighting each of the corresponding sectors according to the corresponding highest intensity ranking weather event extant in each of the corresponding sectors in the new selected altitude zone;
ceasing display of the first rendered image; and
displaying the new rendered image on the GUI.

18. The method of claim 1, wherein a weather event in the plurality of weather events is selected from the group consisting of: clear weather, icing conditions, turbulence, cross winds, a cloud layer, a cloud base, a temperature, a wind speed, and combinations thereof.

19. A system comprising:
a processor;
a communication device connected to the processor;
a non-transitory computer readable storage medium connected to the processor and storing:
weather data representing a plurality of weather events present in at least one of a plurality of altitude zones for a physical area centered on a reference point,
a corresponding intensity rank assigned to each of the plurality of weather events,
a corresponding grid defined for the physical area at each of the plurality of altitude zones, the corresponding grid comprising corresponding sectors defined by corresponding lines and vertices,
a corresponding highest intensity ranking weather event extant in each of the corresponding sectors,
a selected altitude zone from among the plurality of altitude zones, and
a rendered image comprising a corresponding grid for the selected altitude zone, the corresponding grid for the selected altitude zone comprising corresponding lines and vertices and corresponding sectors highlighted according to the corresponding highest intensity ranking weather event extant in each of the corresponding sectors in the selected altitude zone;
a pre-processing program executable by the processor to:
receive the weather data from the communication device,
assign the corresponding intensity rank to each of the plurality of weather events,
divide each of the plurality of altitude zones into the corresponding grid, assign, to each of the corresponding sectors in the plurality of altitude zones, the corresponding highest intensity ranking weather event extant in the corresponding sectors, and receive a selection of the selected altitude zone; and a rendering engine executable by the processor to generate the rendered image by being configured to:

render the corresponding grid for the selected altitude zone by rendering the corresponding lines and vertices for the selected altitude zone, and render the corresponding sectors for the selected altitude zone, by highlighting each of the corresponding sectors according to the corresponding highest intensity ranking weather event extant in each of the corresponding sectors in the selected altitude zone; and a display device connected to the processor and configured to display the rendered image.

20. A non-transitory computer readable storage medium storing computer useable program code which, when executed by a processor, performs a computer-implemented method of presenting weather data on a graphical user interface (GUI), the computer-implemented method comprising:

receiving the weather data, wherein the weather data represents a plurality of weather events, and wherein at least one of the plurality of weather events is present in at least one of a plurality of altitude zones for a physical area centered on a reference point;

assigning a corresponding intensity rank to each of the plurality of weather events;

dividing each of the plurality of altitude zones into a corresponding grid defined for the physical area, each corresponding grid comprising corresponding sectors defined by corresponding lines and vertices;

assigning, to each of the corresponding sectors in the plurality of altitude zones, a corresponding highest intensity ranking weather event extant in the corresponding sectors;

receiving a selection of a selected altitude zone from among the plurality of altitude zones;

generating a rendered image by rendering the corresponding grid for the selected altitude zone; and displaying the rendered image on the GUI.

* * * * *